(12) United States Patent
Lucas et al.

(10) Patent No.: US 11,429,337 B2
(45) Date of Patent: Aug. 30, 2022

(54) DISPLAYING CONTENT TO USERS IN A MULTIPLAYER VENUE

(71) Applicant: Immersive Robotics Pty Ltd, Fortitude Valley (AU)

(72) Inventors: Timothy Simon Lucas, Queensland (AU); Daniel Liam Fitzgerald, Queensland (AU); Rodney Ian Lamb, Queensland (AU)

(73) Assignee: IMMERSIVE ROBOTICS PTY LTD, Fortitude Valley (AU)

( * ) Notice: Subject to any disclaimer, the term of this patent is extended or adjusted under 35 U.S.C. 154(b) by 83 days.

(21) Appl. No.: 16/484,335

(22) PCT Filed: Feb. 7, 2018

(86) PCT No.: PCT/AU2018/050091
§ 371 (c)(1),
(2) Date: Aug. 7, 2019

(87) PCT Pub. No.: WO2018/145154
PCT Pub. Date: Aug. 16, 2018

(65) Prior Publication Data
US 2019/0369942 A1    Dec. 5, 2019

Related U.S. Application Data

(60) Provisional application No. 62/553,334, filed on Sep. 1, 2017, provisional application No. 62/461,185, filed on Feb. 20, 2017.

(30) Foreign Application Priority Data

Feb. 8, 2017 (AU) ............................... 2017900390

(51) Int. Cl.
*G06F 3/14* (2006.01)
*G02B 27/01* (2006.01)
(Continued)

(52) U.S. Cl.
CPC ......... *G06F 3/1446* (2013.01); *G02B 27/017* (2013.01); *G02B 27/0172* (2013.01);
(Continued)

(58) Field of Classification Search
CPC ..... H04B 7/024; H04B 7/0617; H04W 16/02; H04W 12/33; H04W 12/47; G02B 27/017; G02B 27/0172
See application file for complete search history.

(56) References Cited

U.S. PATENT DOCUMENTS

| 4,504,263 | A | 3/1985 | Steuer |
| 5,325,125 | A | 6/1994 | Naimpally |

(Continued)

FOREIGN PATENT DOCUMENTS

| CA | 2798300 | 7/2014 |
| CN | 1675929 | 9/2005 |

(Continued)

OTHER PUBLICATIONS

Examination Report for European Application No. 17812313.9 dated Nov. 5, 2020, 6 pages.
(Continued)

*Primary Examiner* — Priyank J Shah
(74) *Attorney, Agent, or Firm* — Fish IP Law, LLP

(57) ABSTRACT

A system for displaying content to a plurality of users in a multiplayer venue including: a plurality of wearable display systems, each display system being worn by a user, a content system that generates a plurality of content streams, each content stream being associated with a corresponding display system, a location system that detects a location of each display system within the venue, a transmission system including a number of transmission system antennas that wirelessly communicate with the display systems to transmit content to the wearable display systems and to receive data (Continued)

from the wearable display systems and a control system that determines the location of each display system within the venue from the location system and selectively controls transmitting antennas in accordance with the location of each display system to transmit each content stream to the corresponding display system or receive data from a corresponding display system.

19 Claims, 16 Drawing Sheets

(51) Int. Cl.
| | |
|---|---|
| H04B 7/024 | (2017.01) |
| H04B 7/06 | (2006.01) |
| H04W 4/021 | (2018.01) |
| H04B 17/318 | (2015.01) |
| H04W 4/80 | (2018.01) |
| H04W 16/28 | (2009.01) |
| H04W 88/06 | (2009.01) |
| H04M 1/72454 | (2021.01) |
| G06V 20/20 | (2022.01) |

(52) U.S. Cl.
CPC ............. *G06V 20/20* (2022.01); *H04B 7/024* (2013.01); *H04B 7/0615* (2013.01); *H04B 7/0617* (2013.01); *H04B 17/318* (2015.01); *H04M 1/72454* (2021.01); *H04W 4/021* (2013.01); *H04W 4/80* (2018.02); *H04W 16/28* (2013.01); *H04W 88/06* (2013.01)

(56) References Cited

U.S. PATENT DOCUMENTS

| | | | |
|---|---|---|---|
| 5,559,557 A | 9/1996 | Kato | |
| 5,703,793 A | 12/1997 | Wise et al. | |
| 5,909,250 A | 6/1999 | Hardiman | |
| 5,963,673 A | 10/1999 | Kodama | |
| 6,078,349 A | 6/2000 | Molloy | |
| 6,091,777 A | 7/2000 | Guetz et al. | |
| 6,101,284 A | 8/2000 | Matsubara et al. | |
| 6,233,590 B1 | 5/2001 | Shaw et al. | |
| 6,249,614 B1 | 6/2001 | Kolesnik et al. | |
| 6,252,989 B1 | 6/2001 | Geisler | |
| 6,259,991 B1 | 7/2001 | Nysen | |
| 6,310,962 B1 | 10/2001 | Chung | |
| 6,353,685 B1 | 3/2002 | Wu et al. | |
| 7,027,655 B2 | 4/2006 | Kenney | |
| 7,689,047 B2 | 3/2010 | Bahar | |
| 7,692,642 B2 | 4/2010 | Wyatt | |
| 7,734,105 B2 | 6/2010 | Strom | |
| 7,904,117 B2* | 3/2011 | Doan | H04B 7/0615 455/562.1 |
| 8,098,941 B2 | 1/2012 | Moussavi | |
| 8,184,069 B1 | 5/2012 | Rhodes | |
| 8,369,324 B1 | 2/2013 | Breight et al. | |
| 8,374,242 B1 | 2/2013 | Lewis | |
| 8,366,552 B2 | 4/2013 | Roman | |
| 8,416,847 B2 | 4/2013 | Roman | |
| 8,457,026 B1* | 6/2013 | Ho | H04B 7/0617 342/359 |
| 8,787,454 B1 | 7/2014 | Chechik et al. | |
| 9,367,499 B2 | 6/2016 | Yun et al. | |
| 9,596,053 B1 | 3/2017 | Marupaduga et al. | |
| 9,648,346 B2 | 5/2017 | Zhang | |
| 9,665,332 B2 | 5/2017 | Otsuka | |
| 9,811,874 B2 | 11/2017 | Narayanan et al. | |
| 10,155,160 B2 | 12/2018 | van der Laan et al. | |
| 10,224,758 B2* | 3/2019 | Leabman | H02J 50/402 |
| 10,237,577 B2 | 3/2019 | Jeong et al. | |
| 10,243,414 B1* | 3/2019 | Leabman | H02J 50/80 |
| 10,657,674 B2 | 5/2020 | Fitzgerald | |
| 2001/0007575 A1 | 7/2001 | Mori | |
| 2002/0090140 A1 | 7/2002 | Thirsk | |
| 2002/0154693 A1 | 10/2002 | Demos et al. | |
| 2003/0138150 A1 | 7/2003 | Srinivasan | |
| 2005/0018911 A1 | 1/2005 | Deever | |
| 2006/0195464 A1 | 8/2006 | Guo | |
| 2007/0037528 A1* | 2/2007 | Doan | H04B 7/0615 455/562.1 |
| 2007/0263938 A1 | 11/2007 | Lee | |
| 2008/0055318 A1 | 3/2008 | Glen | |
| 2008/0211901 A1 | 9/2008 | Civanlar et al. | |
| 2008/0266410 A1 | 10/2008 | Fukuhara | |
| 2009/0016631 A1 | 1/2009 | Naito | |
| 2009/0033588 A1* | 2/2009 | Kajita | G06T 19/006 345/2.3 |
| 2010/0093282 A1 | 4/2010 | Martikkala et al. | |
| 2010/0124279 A1 | 5/2010 | Reddy et al. | |
| 2011/0038556 A1 | 2/2011 | Mathe | |
| 2011/0235706 A1 | 9/2011 | Demircin | |
| 2012/0206452 A1 | 8/2012 | Geisner et al. | |
| 2012/0314026 A1 | 12/2012 | Chen et al. | |
| 2013/0040682 A1* | 2/2013 | Chang | H04W 24/10 342/368 |
| 2013/0215961 A1 | 8/2013 | Nakagawa et al. | |
| 2014/0022125 A1 | 1/2014 | Zhu | |
| 2014/0118398 A1 | 5/2014 | Hall | |
| 2014/0128032 A1 | 5/2014 | Muthukumar | |
| 2014/0184475 A1 | 7/2014 | Fantos | |
| 2014/0218236 A1 | 8/2014 | Sadeghi et al. | |
| 2014/0348438 A1 | 11/2014 | Yang | |
| 2014/0357993 A1 | 12/2014 | Hiriyannaiah et al. | |
| 2015/0031296 A1 | 1/2015 | Holman et al. | |
| 2015/0103183 A1* | 4/2015 | Abbott | H04N 5/272 348/169 |
| 2015/0172545 A1 | 6/2015 | Szabo | |
| 2015/0237351 A1 | 8/2015 | Lee et al. | |
| 2015/0279103 A1 | 10/2015 | Naegle et al. | |
| 2016/0119646 A1 | 4/2016 | Eslami | |
| 2016/0127490 A1 | 5/2016 | Li | |
| 2016/0248995 A1 | 8/2016 | Mullins et al. | |
| 2016/0267884 A1 | 9/2016 | Binstock et al. | |
| 2016/0357367 A1 | 12/2016 | Foster | |
| 2016/0381398 A1 | 12/2016 | Saxena | |
| 2017/0006290 A1 | 1/2017 | Osawa | |
| 2017/0069227 A1 | 3/2017 | Dialameh et al. | |
| 2017/0075416 A1 | 3/2017 | Armstrong | |
| 2017/0085872 A1 | 3/2017 | Perron | |
| 2017/0150147 A1 | 5/2017 | Forsyth et al. | |
| 2017/0221182 A1 | 8/2017 | Cawley et al. | |
| 2017/0236252 A1 | 8/2017 | Nguyen | |
| 2017/0285735 A1 | 10/2017 | Young et al. | |
| 2017/0324951 A1 | 11/2017 | Raveendran | |
| 2017/0352322 A1 | 12/2017 | Spence et al. | |
| 2018/0054241 A1* | 2/2018 | Pi | H04B 7/0421 |
| 2018/0089091 A1 | 3/2018 | Akenine-Moller | |
| 2018/0093177 A1 | 4/2018 | Tokubo | |
| 2018/0095529 A1* | 4/2018 | Tokubo | G06F 3/012 |
| 2018/0146198 A1 | 5/2018 | Atluru | |
| 2018/0268571 A1 | 9/2018 | Park | |
| 2018/0357809 A1 | 12/2018 | Lawless et al. | |
| 2019/0019315 A1 | 1/2019 | Bastani et al. | |
| 2019/0033058 A1* | 1/2019 | Tsurumi | G06F 3/0304 |
| 2019/0122436 A1 | 4/2019 | Bashkirov et al. | |
| 2019/0141324 A1 | 5/2019 | Bjorklund | |
| 2019/0378305 A1 | 12/2019 | Fitzgerald | |
| 2020/0081524 A1 | 3/2020 | Schmidt | |

FOREIGN PATENT DOCUMENTS

| | | |
|---|---|---|
| CN | 103096075 | 5/2013 |
| CN | 103188491 | 7/2013 |
| CN | 106688229 | 5/2017 |
| EP | 1720356 | 5/2005 |
| EP | 1720356 | 11/2006 |
| EP | 1892965 | 2/2008 |
| EP | 1892965 A2 | 2/2008 |
| EP | 3013053 A2 | 4/2016 |
| EP | 3313144 | 4/2018 |

(56) References Cited

FOREIGN PATENT DOCUMENTS

| | | |
|---|---|---|
| EP | 3336685 | 9/2018 |
| GB | 2450422 | 12/2008 |
| GB | 2478583 | 9/2011 |
| GB | 2480825 | 12/2011 |
| GB | 2484736 | 4/2012 |
| GB | 2485613 | 5/2012 |
| GB | 2485977 | 6/2012 |
| GB | 2486411 | 6/2012 |
| GB | 2486412 | 6/2012 |
| GB | 2486431 | 6/2012 |
| GB | 2486434 | 6/2012 |
| GB | 2486457 | 6/2012 |
| GB | 2488094 | 8/2012 |
| GB | 2538797 | 9/2019 |
| JP | 2011508995 A | 3/2011 |
| JP | 2012521268 A | 9/2012 |
| JP | 2019041394 | 3/2019 |
| KR | 20160109066 A | 9/2016 |
| TW | I334716 | 12/2010 |
| WO | WO2004014077 A1 | 2/2004 |
| WO | 2005083558 | 9/2005 |
| WO | 2007020408 | 2/2007 |
| WO | 2009007693 | 1/2009 |
| WO | 2009013499 | 1/2009 |
| WO | WO2009073824 A1 | 6/2009 |
| WO | WO2010111100 A1 | 9/2010 |
| WO | 2010114512 | 10/2010 |
| WO | 2010136781 | 12/2010 |
| WO | 2010138124 | 12/2010 |
| WO | 2010144096 | 12/2010 |
| WO | 2011022014 | 2/2011 |
| WO | 2012056198 | 5/2012 |
| WO | 2012066292 | 5/2012 |
| WO | 2012177378 | 12/2012 |
| WO | WO2012177378 A2 | 12/2012 |
| WO | 2014096791 | 6/2014 |
| WO | 2014177869 | 11/2014 |
| WO | 2014195673 | 12/2014 |
| WO | 2014207439 | 12/2014 |
| WO | 2015079215 | 6/2015 |
| WO | 2015092356 | 6/2015 |
| WO | 2015150727 | 10/2015 |
| WO | 2015180663 | 12/2015 |
| WO | WO2015180663 A1 | 12/2015 |
| WO | 2016016607 | 2/2016 |
| WO | 2016071670 | 5/2016 |
| WO | 2016097689 | 6/2016 |
| WO | 2016097694 | 6/2016 |
| WO | 2016110679 | 7/2016 |
| WO | 2016135441 | 9/2016 |
| WO | 2016142713 | 9/2016 |
| WO | 2016146992 | 9/2016 |
| WO | 2016151291 | 9/2016 |
| WO | 2016156801 | 10/2016 |
| WO | 2016174392 | 11/2016 |
| WO | 2016189294 | 12/2016 |
| WO | 2017021687 | 2/2017 |
| WO | 2017051171 | 3/2017 |
| WO | WO-2017051171 A1 | 3/2017 |
| WO | 2017060678 | 4/2017 |
| WO | WO-2017060678 A1 | 4/2017 |
| WO | 2017072483 | 5/2017 |
| WO | 2017072484 | 5/2017 |
| WO | 2017085462 | 5/2017 |
| WO | WO-2017072483 A1 | 5/2017 |
| WO | WO-2017072484 A1 | 5/2017 |
| WO | WO-2017085462 A1 | 5/2017 |
| WO | 2017098231 | 6/2017 |
| WO | 2017103571 | 6/2017 |
| WO | WO-2017098231 A1 | 6/2017 |
| WO | WO-2017103571 A1 | 6/2017 |
| WO | 2017191429 | 11/2017 |
| WO | WO-2017191429 A1 | 11/2017 |
| WO | 2017207971 | 12/2017 |
| WO | WO-2017207971 A | 12/2017 |
| WO | WO2017214671 A1 | 12/2017 |
| WO | 2018046892 | 3/2018 |
| WO | 2018055332 | 3/2018 |
| WO | WO-2018046892 A1 | 3/2018 |
| WO | WO-2018055332 A1 | 3/2018 |
| WO | 2018082904 | 5/2018 |
| WO | WO-2018082904 A1 | 5/2018 |
| WO | WO2018145153 A1 | 8/2018 |
| WO | WO2018145154 A1 | 8/2018 |
| WO | 2018211287 | 11/2018 |
| WO | WO-2018200993 A1 | 11/2018 |
| WO | WO-2018211287 A1 | 11/2018 |
| WO | 2018224841 | 12/2018 |
| WO | 2018224842 | 12/2018 |
| WO | 2018229458 | 12/2018 |
| WO | 2018229462 | 12/2018 |
| WO | WO2018223179 A1 | 12/2018 |
| WO | WO-2018224841 A1 | 12/2018 |
| WO | WO-2018224842 A1 | 12/2018 |
| WO | WO-2018229458 A1 | 12/2018 |
| WO | WO-2018229462 A1 | 12/2018 |
| WO | 2019025760 | 2/2019 |
| WO | WO-2019025760 A1 | 2/2019 |
| WO | WO2019100108 A1 | 5/2019 |
| WO | WO2019100109 A1 | 5/2019 |

OTHER PUBLICATIONS

Extended European Search Report for European Application No. 17812313.9 dated Jan. 28, 2020, 10 pages.
Extended European Search Report for European Application No. 18750982.3 dated Oct. 21, 2020, 28 pages.
Extended European Search Report for European Application No. 18751812.1 dated Sep. 24, 2020, 19 pages.
Extended European Search Report for European Application No. 18813535.4 dated Oct. 26, 2020, 9 pages.
International Preliminary Report on Patentability for Application No. PCT/AU2017/050594 dated Dec. 27, 2018, 14 pages.
International Preliminary Report on Patentability for Application No. PCT/AU2018/050534 dated Dec. 19, 2019, 8 pages.
International Preliminary Report on Patentability for Application No. PCT/AU2018/051237 dated Jun. 4, 2020, 8 pages.
International Preliminary Report on Patentability for Application No. PCT/AU2018/051239 dated Jun. 4, 2020, 13 pages.
International Search Report and Written Opinion for Application No. PCT/AU2018/050090 dated Apr. 6, 2018, 11 pages.
International Search Report and Written Opinion for Application No. PCT/AU2018/050091 dated Apr. 6, 2018, 10 pages.
International Search Report and Written Opinion for Application No. PCT/AU2018/051239 dated Feb. 4, 2019, 15 pages.
International Search report for Application No. PCT/AU2018/050534 dated Aug. 17, 2018, 13 pages.
International Search Report for Application No. PCT/AU2018/051237 dated Jan. 30, 2019, 4 pages.
Search Information Statement for Application No. PCT/AU2018/051237 mailed on Jan. 30, 2019, 1 page.
Written Opinion for Application No. PCT/AU2017/050594 dated Aug. 17, 2017, 12 pages.
Written Opinion for Application No. PCT/AU2018/050534 dated Aug. 17, 2018, 6 pages.
Written Opinion for Application No. PCT/AU2018/051237 dated Jan. 30, 2019, 6 pages.
Farid et al., "Adaptive Wavelet Eye-Gaze Based Video Compression", Proceedings of SPIE, vol. 4877, Published 2003, 9 pages.).
PCT Search Report for PCT/AU2017/050594 entitled Image Compression Method and Apparatus filed Jun. 14, 2017 in the name of Immersive Robotics Pty Ltd (Queensland, AU) dated Aug. 17, 2107 (9 pages).
PCT Search Report for PCT/AU2018/050090 entitled "Antenna Control for Mobile Device Communication" in the name of Immersive Robotics Pty Ltd dated Apr. 6, 2018 (5 pages).
PCT Search Report for PCT/AU2018/050091 entitled "Displaying Content to Users in a Multiplayer Venue" in the name of Immersive Robotics Pty Ltd dated Apr. 6, 2018 (5 pages).

(56) References Cited

OTHER PUBLICATIONS

Yao et al., "A Novel Color Image Compression Algorithm Using the Human Visual Contrast Sensitivity Characteristics", Photonic Sensors (2016), published Jul. 15, 2016 <https://link.springer.com/article/10.1007/s13320-016-0355-3> (10 pages).
Taylor, Clark N.; et al. "Adaptive Image Compression for Wireless Multimedia Communication," University of California San Diego. 5 Pages.
Behnam Bastani, et al., "Strategies for Foveated Compression and Transmission", Symposium for Information Display, Palisades Convention Management, Inc. 2017, 4 pages.
Anderson G.B., et al., "Piecewise Fourier Transformation for Picture Bandwidth Compression," IEEE Transactions on Communication Technology, Apr. 1, 1971, vol. 19 (2), pp. 133-140, XP011218516.
Examination Opinions for Taiwan Patent Application No. 106119982 dated Feb. 3, 2021, 99 pages.
Extended European Search Report for European Application No. 18880508.9 dated Feb. 25, 2021, 8 pages.
International Search Report and Written Opinion for Application No. PCT/AU2020/051115 dated Nov. 17, 2020, 12 pages.
Taylor C.N., et al., "Adaptive Image Compression for Wireless Multimedia Communication," IEEE, University of California, San Diego, 2001, pp. 1925-1929.
European Search Report for European Patent Application No. 18881879.3-1208, dated Jun. 24, 2021, 10 pages.
Examination report dated Mar. 24, 2022, for related Australian application No. 2018217434. 3 pages.
Anderson, et al. "Piecewise Fourier Transformation for Picture Bandwidth Compression," IEEE Transactions on Communication Technology. vol. COM-19, No. 2, Apr. 1971. 8 pages.
Office action dated Nov. 19, 2021, from related Taiwanese application No. 107116357. 6 pages.
Gonzalez, et al. "Digital Image Processing," Pearson Education International. Third Edition. 976 pages.

\* cited by examiner

DISPLAYING CONTENT TO USERS IN A MULTIPLAYER VENUE

BACKGROUND OF THE INVENTION

The present invention relates to a system and method for displaying content to a plurality of users in a multiplayer venue, and in one particular example to displaying content, such as Augmented Reality (AR) or Virtual Reality (VR) content, to multiple players in a multiplayer venue.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide multiplayer venues for games, such as laser tag. In this instance, each player wears equipment such as infrared-sensitive targets, which can be shot by lasers of other players.

In recent years, virtual and augmented reality systems have been developed in which content is provided to a wearable display device, such as a Head Mounted Display (HMD), which displays information to a wearer based on the relative spatial position and/or orientation of the display device. Such systems operate by generating images based on information regarding the pose (position and orientation) of the display device, so that as the display device moves, the images are updated to reflect the new pose of the display device.

In order to avoid motion sickness, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™ and Playstation VR™ require a wired connection between the computer and the HMD, which is inconvenient.

Whilst wireless systems have been developed, the transmission requirements make these unsuitable for use in multiple player scenarios with existing hardware infrastructure.

A further issue with wireless transmission systems is ensuring adequate signal strength and bandwidth, with minimal latency. In this regard, when using beam forming in a phased antenna array, the array typically performs a scan, known as a sweep, in which the beam is swept over a region in which the receiver is located in order to identify the particular beam configuration that results in the strongest received signal. The sweep process typically takes an amount of time, such as 20 ms, which can in turn lead to reductions in transmission bandwidth and increased latency, which is undesirable. Furthermore, in the event that a beam steering process loses contact with the counterpart antenna, it must perform a broader sweep and then subsequent narrowing focus procedure to find the antenna again, which introduces further latency, and which can often result in a drop out of video signals and head tracking when used in digital reality scenarios. This in turn leads to a further latency to allow the entire system to reconnect.

An additional associated problem in multi-player venues is that of interference between wireless communications with different headsets. In this regard, communication between headsets and a base station is typically two way, with antennas on both the base station and headsets using signal sweeps to optimise the signal. Sweeps performed by multiple headsets can result in significant interference, in turn resulting in lost data packets and a corresponding loss in signal quality.

SUMMARY OF THE PRESENT INVENTION

In one broad form an aspect of the present invention seeks to provide a system for displaying content to a plurality of users in a multiplayer venue, the system including: a plurality of wearable display systems, each display system being worn by a user and including: a display device to display a content stream; and, a display system antenna; a content system that generates a plurality of content streams, each content stream being associated with a corresponding display system; a location system that detects a location of each display system within the venue; a transmission system including a number of transmission system antennas that wirelessly communicate with the display systems to transmit content to the wearable display systems and to receive data from the wearable display systems; and, a control system that: determines the location of each display system within the venue from the location system; and, selectively controls transmitting antennas in accordance with the location of each display system to thereby at least one of: transmit each content stream to the corresponding display system; and receive data from a corresponding display system.

In one embodiment the transmitting antenna is at least one of a display system antenna and a transmission system antenna.

In one embodiment the antenna is a phased antenna array and the control system controls the antenna array to perform at least one of: beam steering; and, beam forming.

In one embodiment the control system includes a respective controller for each antenna, with each antenna transmitting a respective content stream and wherein the controller: determines the location of the corresponding display system for the respective content stream; and, controls the antenna in accordance with the location of the corresponding display system.

In one embodiment the transmission system includes a plurality of transmitters and wherein each transmitter transmits a respective content stream via a respective antenna.

In one embodiment the system includes multiple antennas and wherein the control system controls which of the multiple antennas transmits the content in accordance with the location of each wearable display system.

In one embodiment the content system includes a plurality of content engines and wherein each content engine generates a content stream for a corresponding display system.

In one embodiment the content system: determines at least one of a position and orientation of a display system from at least one of: the location system; and, a positioning system; and generates the content stream for the display system based on the at least one of a position and orientation.

In one embodiment the location system includes: multiple beacons provided in the venue; and, a location processing device that determines a location of a display system based on a position of the display system relative to at least two beacons and positions of the at least two beacons in the venue.

In one embodiment the location system includes, a location module in each display system that: detects a signal from at least two beacons; calculates a position of the display system relative to the at least two beacons; and, transmits location data indicative of the location to the location processing device via a wireless communications system.

In one embodiment the beacons transmit an electromagnetic signal and wherein the location module includes: a detector that detects the electromagnetic signal; and, a location module processor that calculates the position of the display system relative the beacon using the detected electromagnetic signal.

In one embodiment the location module processor calculates the position of the display system relative to the beacon using at least one of: a detected signal strength; and a detected time of flight.

In one embodiment the location system includes a location module in each display system that determines a display system location relative to the venue.

In one embodiment the display system transmits a location indication indicative of the display system location to the control system and wherein the control system: receives the location indication; determines the display system location; and, selectively controls at least one antenna in accordance with the display system location.

In one embodiment the location module includes a range sensor that determines a range of the display system from an environment.

In one embodiment the location module determines the display system location using a simultaneous localization and mapping algorithm.

In one embodiment the location system is a positioning system that determines a pose relative to an environment and wherein the control system: determines a relative pose of the wearable display system and transmission system antennas; and, selectively controls a transmitting antenna in accordance with the relative pose.

In one embodiment the control system: determines movement of a wearable display system; and, controls a transmitting antenna in accordance with the determined movement.

In one embodiment the control system controls the transmitting antenna in accordance with movement of the wearable display system and a predictive algorithm.

In one embodiment the control system tracks movement of a wearable display system in accordance with the multiple location indications and controls the antenna in accordance with the movement.

In one embodiment location data is transmitted via a mesh network established at least in part using wireless communication systems of multiple wearable display systems.

In one embodiment the location system includes a location processing device that: receives the location data from a location module of a display system; uses the location data to determine: an identity of the display system; and, the location of the display system; and, provides a location indication indicative of the location of the display system to the control system in accordance with the identity of the display system.

In one embodiment the location indication is provided to a respective controller in accordance with the identity of the display system.

In one embodiment the location system includes beacons forming part of the transmission system.

In one embodiment the system includes a plurality of encoders, each encoder compressing a respective content stream to thereby generate a compressed content stream that is transmitted to the display system and wherein each display system includes a decoder for decompressing the compressed content stream.

In one embodiment for each display system the system includes: a content engine that generates the content stream; an encoder that encodes the content stream to thereby generate a compressed content stream; an antenna; a transmitter that wirelessly transmits the compressed content stream via the antenna; and, a controller that: determines the location of the display system from a location system; and, controls an orientation of the antenna in accordance with the location of the display system.

In one embodiment each display system includes: a receiver module that wirelessly receives the content stream from an antenna of the transmission system; and, a display processing device that causes the content stream to be displayed on the display.

In one embodiment the receiver module includes a decoder for decompressing a compressed content stream.

In one embodiment the control system: retrieves an environment map; and, selectively controls the transmitting antenna at least partially in accordance with the location and the environment map.

In one embodiment the environment map is at least one of an occlusion map and a reflection map.

In one embodiment the control system: retrieves an occlusion map defining: occlusion locations within the venue; and, a transmission path to avoid the occlusion; and, selectively controls the antennas in accordance with the location of each display system and the occlusion map.

In one embodiment the control system: detects occlusion of a display system; controls one or more antennas to adjust a transmission direction to thereby re-establish communication with the display system; determines a display system location; and, updates an occlusion map with the display system location and the transmission direction.

In one embodiment the control system: determines a location of at least one other wearable display system; and, controls the antenna in accordance with the location of the at least one other wearable display system.

In one embodiment the control system: determines a communications channel used by the at least one other wearable display system; and, selectively controls a communications channel used by the antenna in accordance with the communications channel of the at least one other wearable display system.

In one embodiment the control system controls a physical orientation of each of a plurality of antennas in accordance with the location of a corresponding display system.

In one embodiment each antenna includes a drive that moves the antenna and wherein the control system activates the drive to adjust the physical orientation of the antenna so that the physical orientation of the antenna tracks the location of the corresponding display system.

In one embodiment the drive adjusts at least one of a pan and tilt of the antenna.

In one broad form an aspect of the present invention seeks to provide a system for displaying content to a plurality of users in a multiplayer venue, the system including: a plurality of wearable display systems, each display system being worn by a user and including a display device to display a content stream; a content system that generates a plurality of content streams, each content stream being associated with a corresponding display system; a location system that detects a location of each display system within the venue; a transmission system including a number of antennas that wirelessly transmit content to the wearable display systems; and, a control system that: determines the location of each display system within the venue from the location system; and, selectively controls the antennas in accordance with the location of each display system to thereby transmit each content stream to the corresponding display system.

In one broad form an aspect of the present invention seeks to provide a display system for use in a system for displaying content to a plurality of users in a multiplayer venue, the display system including: a display device; a processing device that causes the content stream to be displayed on the display device; a receiver module that wirelessly receives the content stream from a transmission system, the transmission system including a number of antennas that transmit content to a plurality of wearable display systems; and, a location module that: calculates a location of the display system in the venue; and, transmits location data indicative of the location to a location processing device via a wireless communications system thereby allowing the location processing device to determine a location of the display system.

In one embodiment the location module: detects a signal from at least two beacons within the venue; and, calculates a position of the display system relative to the at least two beacons.

In one embodiment the location module includes a range sensor that determines a range of the display system from the environment, and wherein the location module determines the display system location using a simultaneous localization and mapping algorithm.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
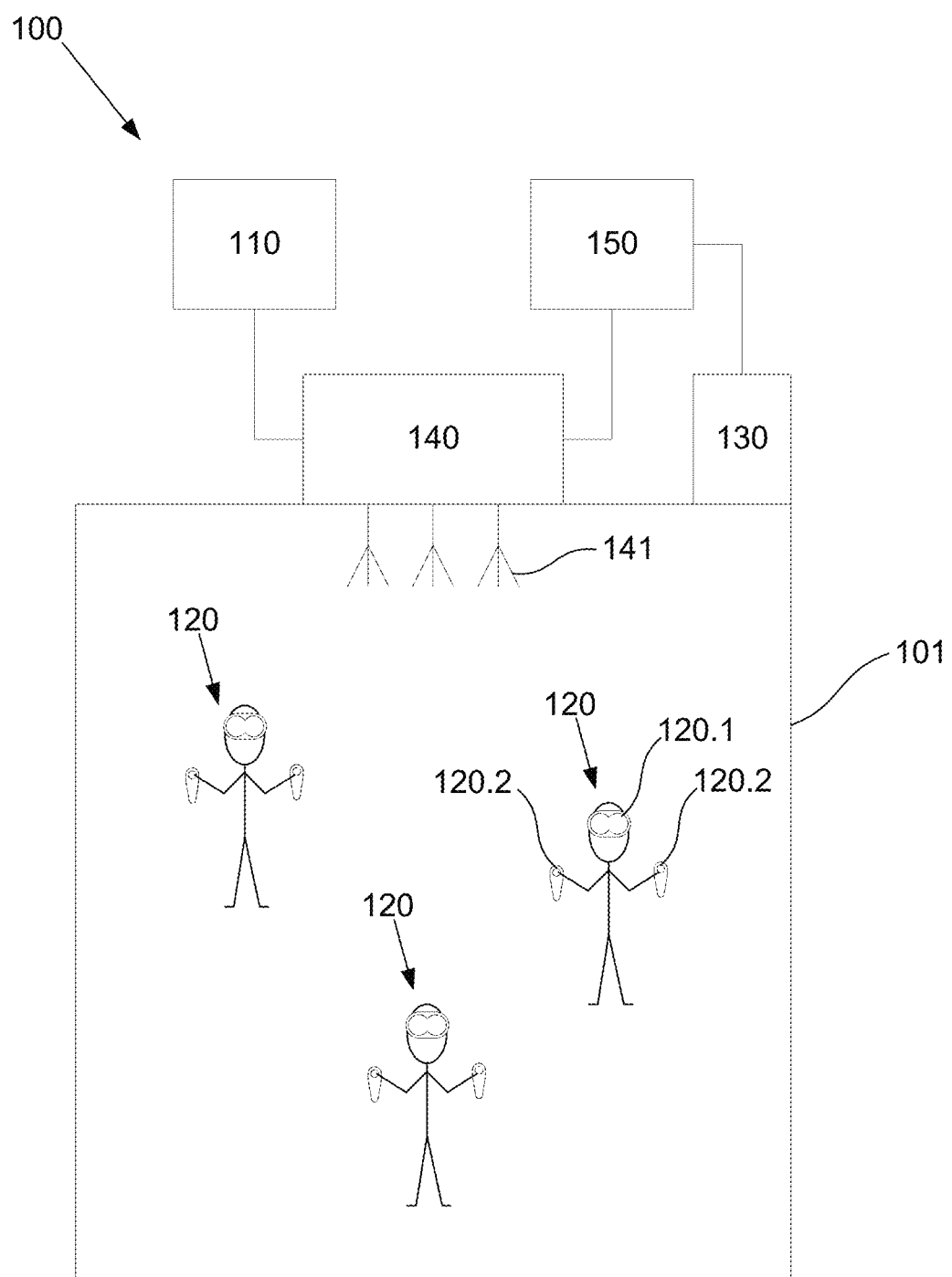
FIG. 1 is a schematic diagram of a first example of a system for displaying content to a plurality of users in a multiplayer venue.

An example of a system for displaying content to a plurality of users in a multiplayer venue will now be described with reference to FIG. 1.

In this example, the system 100 is designed to be used in a venue 101 in which a number of users are utilising wearable display systems 120. Each wearable display system 120 is worn by a particular user and generally includes a display device 120.1 that is adapted to display a content stream, and optionally may include one or more associated controllers 120.2, for example to allow users to interact with presented content. It will be appreciated that associated components, such as transceivers and display system antennas, sensors and processing arrangements will also typically be provided and integrated into a wearable system.

The content stream typically includes one or more images, and more typically a sequence of images that are generated and/or displayed based on a relative position and/or orientation of the display, as occurs for example in the case of VR and AR applications. In one example, the wearable display system could therefore be an existing commercial display device, such as an HTC Vive™, Oculus Rift™ or Playstation VR™ headset, Microsoft HoloLens™, although it will be appreciated that this is not essential and any suitable arrangement could be used.

The system further includes a content system 110 that generates a plurality of content streams, with each content stream being associated with a corresponding display system. The content system could be of any appropriate form, and in one example includes one or more processing systems, such as computer systems, adapted to generate the content.

The apparatus further includes a location system 130 that detects a location of each display system 120 within the venue 101. The location system could be of any appropriate form, and could form part of the VR/AR system or could be a separate location system, examples of which will be described in more detail below.

A transmission system 140 is provided including a number of transmission system antennas 141 that transmit content to the wearable display systems and/or receive data from the wearable display systems. The transmission system typically includes processing electronics required in order to generate signals for transmission, and may include a commercial wireless transceiver, as well as any additional required components, such as an encoder for encoding the signals prior to transmission. Whilst the antennas could be of any suitable form, the antennas generally include directional antennas that are capable of providing sufficient transmission bandwidth and low latency in order to transmit the content streams to the wearable display systems 120.

In order to optimise transmission between the transmission system antennas 141 and the display systems 120, the system further includes a control system 150 that determines the location of each display system within the venue from the location system 130 and then selectively controls the transmission system antennas 141 in accordance with the location of each display system to thereby transmit each content stream to the corresponding display system.

The manner in which control is performed will vary depending upon the implementation and in particular configurations of the transmission system antennas 141. For example, the transmission system antennas 141 could include movable antennas, with the control process including changing the physical orientation of an antenna 141. Alternatively the transmission system antennas 141 could be static and provided at respective locations within the venue, with the control process including transmitting the content stream via a respective one of the different transmission system antennas 141 depending on the location of the wearable display system 120.

Accordingly, it will be appreciated that the above described system allows content to be transmitted to multiple wearable display systems in a venue 101, in particular by controlling one or more transmission system antennas 141 to thereby allow content to be transmitted via one or more directional antennas directly to the display system, regardless of the display system location. This process is performed to maximise the effective signal transmission strength, in turn maximising available bandwidth and maintaining minimal latency, and assisting in reducing interference between different display systems. For example, this avoids the need for signal sweeps to be performed in order to maximise signal strength, which can introduce significant latency, as well as creating interference with transmissions to/from other display systems. This arrangement therefore enables large scale wireless multiplayer VR or AR systems to be implemented, which is not otherwise feasible.

It will also be appreciated that the display systems 120 typically include display system antennas (not shown), which can be used to transmit data back to the transmission system. The transmitted data can include location and/or position and orientation data, which may be required to generate the content, as well as other data such as information captured by onboard camera systems, input commands provided by a user via a control input, or the like. In this instance, an analogous process can be performed, with the control system operating to control the display system antennas, so that signals are transmitted back to the transmission system, allowing these to be received and processed. Again this can involve controlling directional display system antennas so that transmissions are aimed towards the transmission system antennas 141, or other receiving antennas, thereby reducing interference between transmissions to or from other display systems, and avoiding or reducing the need for signal sweeps, which in turn helps maintain signal strength and bandwidth and reduce latency.

A number of further features will now be described.

In one example, the control system 150 controls a physical orientation of each of a plurality of transmission system antennas 141 in accordance with the location of a corresponding display system 120. This could be achieved in any appropriate manner, but is typically performed by having each antenna 141 include a drive that moves the antenna, with the control system 150 activating the drive to adjust the physical orientation of the antenna 141 so that the physical orientation of the antenna 141 tracks the location of the corresponding display system 120. In this regard, the movement that can be performed will vary depending upon the preferred implementation but will typically include at least a panning action to track the user as they move within the venue and may also optionally include a tilt movement in order to optimise an angle of the antenna 141 relative to the location of the user, for example depending on a mounting height of the antenna relative to the user, and the horizontal distance of the user from the antenna 141.

As an alternative to having transmission system antennas 141 whose physical orientation can be adjusted, the system 100 can alternatively include multiple transmission system antennas 141 distributed throughout a venue, with the control system 150 controlling which of the multiple transmission system antennas 141 transmits the content stream to a particular display system 120 in accordance with the location of each display system 120. In one example, this is achieved by having transmission system antennas 141 configured to provide coverage within a respective area within the venue 101, with the antenna 141 used being selected based on which area a user is in. In this instance, it will be appreciated that multiple transmission system antennas 141 would be needed to provide coverage for each area to cope with situations in which multiple users are present in the same area.

As a further alternative, the transmission system antennas 141 could include a phased antenna array and the control system controls the antenna array using beam steering and/or beam forming. In this example, the antenna generally uses a phased array of elements on each antenna, allowing the shape and direction of a transmitted signal to be controlled. This can be done either between the multiple elements on a single antenna or treating elements across multiple antennas as a single configurable array, by phasing or switching between elements and antennas. Suitable control of the elements can be used to create interference patterns in a process known as beam forming. Dynamically adapting the beam pattern by changing the signal phase in real time without changing the antenna elements or other hardware is called beam steering. Phased array beam forming creates the beam, which is then electronically steered toward the target receiver antenna using beam steering, without requiring the antenna to be physically moved. It will be appreciated that this provides another mechanism in order to direct signals towards the wearable display devices.

It will be appreciated that similar processes can be used in respect of display system antennas. For example, the display system could include multiple antennas, with a respective one of the display system antennas being selected as required, depending on the relative position of the display system and base station. Additionally and/or alternatively, this could include a phased antenna array, with the antenna being controlled using beam steering and/or beam forming to control a direction and/or shape of the beam.

The control system 150 typically includes a respective controller for each transmission system antenna 141. In this instance, each transmission system antenna 141 transmits a respective content stream from a given content source, such as a respective content engine, with the controller determining the location of the corresponding display system 120 for the respective content stream and then controlling the transmission system antenna 141 accordingly. Providing a single separate controller for each transmission system antenna 141 simplifies the control processes, with this only requiring that the controller is provided with the location of the respective display system 120 from the location system 130.

Similarly, a respective control system could be provided for each wearable display system, with this either being integrated into the display system, or located remotely, depending on the preferred implementation. However, it will be appreciated that this is not essential and a single central controller could be used to coordinate antennas for multiple different display systems, both at the base station and display system ends.

Typically the content system 110 includes a plurality of content engines, with each content engine generating a content stream for a corresponding display system. The content engine could be a logically discreet entity, such as a respective software application executed by a processing system such as a server, or could represent a physically separate hardware system, such as a respective computer system that generates a content stream for a particular display system. It will be appreciated that the use of a dedicated content engine helps ensure that the content stream can be generated with minimal latency for display by a corresponding display system.

In one example, the content system 110 determines a position and/or orientation of a display system 120, and in particular display device 120.1, from either the location system 130 or a separate positioning system. The content system 110 then generates the content stream for display based on the position and/or orientation of the display device 120.1. Thus, it will be appreciated that the content is generated based on a particular viewpoint of the user of the display system. This may be achieved using the location system 130 used in tracking the display systems 120 in order to control the transmission system antennas 141. Alternatively however this can be performed utilising a different system.

For example, augmented or virtual reality systems may include their own proprietary positioning system for determining the position and/or orientation of the display and it may be possible to use this as the location system 130, in order to ascertain the location of the display system within the venue 101. For example, the display system can include one or more internal sensors that can determine the position and orientation of the display system relative to the environment, for example using a simultaneous localization and mapping (SLAM) algorithm, in a process known as inside out tracking. Alternatively, the system can use external sensors, such as tracking stations, in a process known as outside-in tracking. The ability to use existing tracking systems to determine the location of the display system can reduce the need for a separate location system, although it will be appreciated that this may not provide sufficient information in order to allow the location to be accurately determined, or may not be easily usable, in which case a separate location system 130 may need to be utilised.

In one example, the location system 130 includes a number of beacons provided in the venue 101, and a location processing device that determines a location of a display system 120 based on a position of the display system 120 relative to at least two of the beacons and known positions of the beacons within the venue. Thus, in this example, beacons are provided at known positions within the venue so that a location of the display system 120 relative to the beacons can be used to ascertain the location of the display systems 120 within the venue.

It will be appreciated that this could be achieved in a number of ways. For example, the beacon could be adapted to sense a position of the display system 120, utilising an appropriate sensing technique. More typically however each display system 120 includes a location module that detects a signal from at least two of the beacons, calculates a position of the display system relative to the at least two beacons, and then transmits location data indicative of the location to the location processing device via a wireless communications system. Thus, in this instance, each display system determines its own position relative to the beacons, transmitting this information to a location processing device, allowing the location processing device to then ascertain the location of the display system 120 within the venue 101.

In this regard, it will be appreciated that this process could involve calculation by the location processing device, or could involve simply retrieving an indication of the location from the location data, with the location calculation being performed solely by the display system 120. Thus the location could be determined in the display system itself and transmitted to the control system, or alternatively, information indicative of a location, such as beacon signal strengths, could be provided to the control system, allowing this to determine the location.

In this example, the nature of the signals transmitted by the beacons can vary depending on the preferred implementation but typically the signals are electromagnetic signals such as RF signals, which are detected by a detector, such as a location module antenna. A location module processor then calculates a position of the display system relative to the beacon using the detected electromagnetic signal, for example based on attributes of the signal, such as a signal strength, time of flight, or the like.

Furthermore, whilst the beacons could be separate entities, it will be appreciated that in another example, the beacons could form part of the transmission system, and for example be integrated with the transmission system antennas 141, and that reference to separate beacons is not necessarily intended to be limiting.

In one example, the location module includes a sensor, such as a range sensor, allowing the display system to determine the location in accordance with signals from the sensor, for example using a SLAM algorithm. This could include using a laser range finder or LIDAR, or could be achieved using one or more image capture devices that use stereoscopic images, or multiple images captured from different mobile device poses, in order to resolve a position of the mobile device relative to the environment. Thus, for example, one or more cameras placed in the face of the display system can be used to match common objects across two or more frames to create a computed camera position in 3D space which matches the cameras in the face of the display system. In particular, the SLAM process typically involves determining a separation between the display system and the environment in the form of a point cloud. A 3D model of the venue, including the position of the antennas, is generated during an initial configuration process. The position of the display system in the point cloud can then be compared to the 3D model, allowing the location of the display system relative to the antennas to be determined. This can then be used in order to control the antenna position as required. Again, such determination could be performed onboard the display system, or alternatively ranging information could be transmitted by the display system, allowing the location to be determined remotely.

It will be appreciated that while an on-board inertial measurement unit (IMU) can provide basic 3 degrees of freedom head tracking, this typically provides only limited translational movement tracking, so inside out tracking, using SLAM or other processes that provide translational motion tracking, can be used to provide an absolute head position in 3D space, in particular providing positional information with 6 degrees of freedom, including translational and rotational information. This allows the user to move through the environment and is often referred to as World Scale VR, AR or MR.

It will be appreciated that when pose information is available, this can be further used to enhance the antenna control process. Specifically, in this instance the control system can determine a relative pose of the wearable display system and transmission system antennas and selectively controls a transmitting antenna, such as a transmission system antenna 141 or display system antenna in accordance with the relative pose.

Irrespective of how the location of the display systems is determined, it will be appreciated that performing antenna positioning and/or beam steering or beam forming based on the determined physical location of the display system can avoid the need for sweeps in order to determine position through feedback of received signal strength. This allows the control system to compute and position/steer the antenna much sooner, reducing latency and signal drop outs. This becomes particularly valuable when an array of many antennas is placed around a room in a diversity configuration as it allows for a prediction model to be built on where the user will be located next and subsequently which antenna should be chosen to transmit via.

The prediction could be based on information relating to content displayed on the display systems, for example anticipating movement based on an expected response to content being displayed, and/or based on models of human movement, for example to incorporate physical limitations for locomotion. Additionally, location data could be used to track movement of the display systems over time, which in turn can be used in training predictive algorithms, in order to determine a likely next location for the display system. This can assist in ensuring beam steering/antenna positioning is performed to maintain the tracking system within the antenna beam's field of view, thereby assisting in reducing latency and maintaining bandwidth. In particular, this allows the system to determine movement of a wearable display system and controls a transmitting antenna in accordance with the determined movement and optionally a predictive algorithm. In this instance, the system typically tracks movement of a wearable display system in accordance with the multiple location indications and controls the antenna in accordance with the movement.

Additionally, an IMU with a high update rate could also be placed on the antenna or leveraged from the HMD to provide further vector correction information complimentary to the Inside Out tracking and help to mitigate any temporal latency between the frame-rate of the cameras used to do the tracking.

Figure 10:
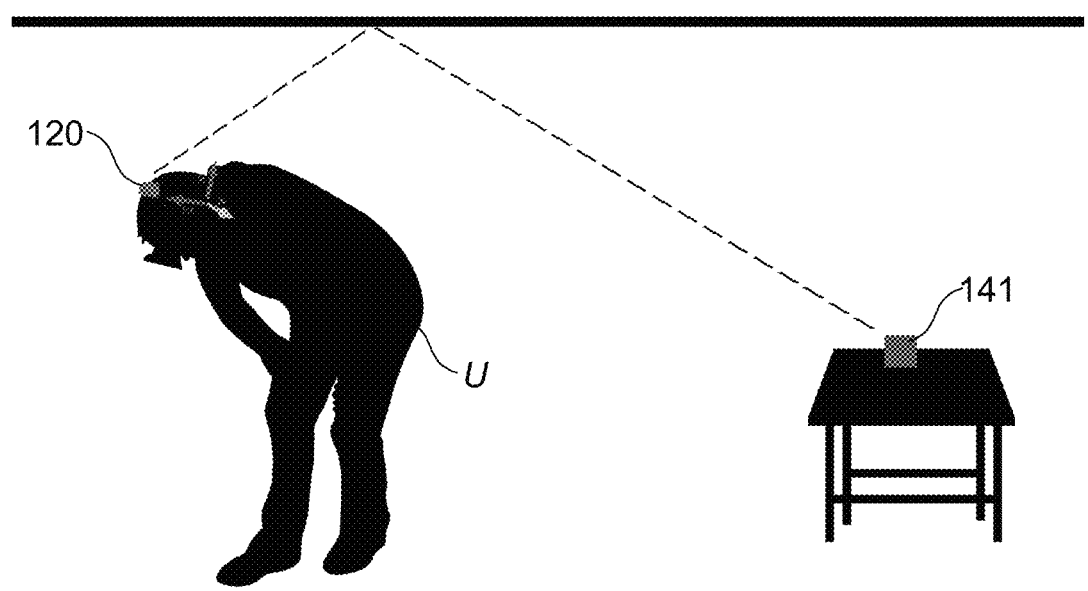
FIG. 10 is a schematic diagram illustrating an occlusion of the display system.

The location data can also further be used to manage situations in which the display system is occluded from the antenna, for example if a user U bends over, so that their body is positioned between the transmission system antenna 141 and the display system 120 as shown in FIG. 10.

In existing systems, the antenna is controlled to perform a search for the display system 120, by sweeping the direction of transmission until the display system receives a signal, typically reflected off a wall or ceiling. Typically there is a delay in identifying that the occlusion has occurred, with a further delay arising in performing the sweep and re-establishing communication.

To avoid this, in one example, the control system retrieves an occlusion map defining occlusion locations within the venue and a transmission path to avoid the occlusion. In this instance, if the control system detects that the display system is in a location where an occlusion is likely the control system can selectively control the antennas in accordance with the location of each display system and the occlusion map, thereby ensuring communication is maintained. This can be achieved in a number of ways, and could include controlling a directionality of the antenna, for example so that the transmission is reflected from a surface, such as a ceiling or wall, or could involve switching the transmission to an alternative antenna for which there is a clear line of sight to the display system.

In order for this to occur, the occlusion map needs to be generated. This is typically achieved by detecting occlusion of a display system, controlling one or more antennas to adjust a transmission direction to thereby re-establish communication with the display system, determining a display system location and updating an occlusion map with the display system location and the transmission direction.

This could be performed in real-time, so that the system learns during use of locations in which occlusions occur, with the room reflections or other alternative transmission paths being learned as a sweep is performed. Whilst this will result in a corresponding delay, it will be appreciated that this would only occur a single time, with the delay being avoided in future.

Additionally and/or alternatively, the occlusion map could be pre-learned during a calibration or initialisation routine. In this instance, a user could be prompted to move the display system to "a defined point" in the "venue". For example, a dot could be presented to the user via the display system, with the user moving to that location to determine if occlusion occurs. This could also involve having the user perform particular actions, such as bending over or the like. In this regard, it will be appreciated that particular actions could be identified based on the display system location, for example if the user bends over, then the location of the display system will be closer to the floor than otherwise. Once an occlusion occurs, a sweep or other reconfiguration of the antennas is performed until communication is re-established, at which point the transmission path used is stored as part of the occlusion map, allowing this to be retrieved and used in future.

A similar process can also be employed for signal reflections, using a reflection map to identify situations in which reflected signals are likely to occur. This can be used to avoid reflections, for example in the event that these are likely to cause interference or a loss in signal quality, but could also be used as a mechanism to avoid occlusions, for example allowing a reflected signal to be used to maintain transmission when signals would otherwise be occluded.

It will also be appreciated that a similar calibration process could be performed by placing the display systems at specific locations in a venue, and/or be scanning a venue to identify the floor, ceiling or other objects that are viable candidates for signal reflection.

It will be appreciated that the ability to leverage signal reflections can be used to enable antennas to be provided in locations which would not otherwise be suitable. For example, the antenna could be incorporated into a base station for use in a home environment, with the above described occlusion and/or reflection mapping process allowing this to be performed with base stations in positions that would otherwise be unsuitable, such as at a low height, such as on a coffee table, top of TV or the like.

Whilst this has been described for the transmission of content to a display system, it will be appreciated that this could also be used for other situations in which signals are transmitted to a mobile device.

Thus, performing occlusion mapping can allow antenna control, including directionality, beam forming or beam steering processes to happen faster and predict an impending occlusion event, making suitable adjustments from stored environment data.

The antenna control process can also be used in order to minimise interference with other display devices. For example, when transmitting, the control system can determine a location of at least one other wearable display system and control the antenna in accordance with the location of the at least one other wearable display system, for example to avoid the transmitted signals interfering with transmission to/from the other wearable display device. As part of this process, the control system can determine a communications channel used by the at least one other wearable display system and selectively control a communications channel used by the antenna in accordance with the communications channel of the at least one other wearable display system. This can be used to change the communications channel in the event that two display systems using the same channel are present in the same part of a venue, thereby avoiding interference between signals transmitted to/from each display system.

The location data can be transmitted to the location processing device in any appropriate manner. In one example, this is performed utilising a mesh network established using location modules of wireless communications systems of multiple wearable display systems 120, and in particular of the respective location module of each wearable display system 120. Such a mesh network can allow data to be transmitted from the display systems 120 to the location processing device utilising low power communications technology, which in turn reduces battery drain and avoids issues of interference resulting from multiple location modules attempting to update their location via a direct communications channel with the location processing device. However, as this can introduce additional latency, in other examples direct point to point communication might be preferred.

It will be appreciated that where a central location processing device receives location data from multiple systems 120, the location processing device determines an identity and location of the display system 120 and then provide a location indication indicative of the location of the respective display system 120 to the control system 150 in accordance with the identity of the display system 120 or location module. In particular, this could be achieved by transferring an indication of the location directly to the particular controller associated with the respective display system 120 as determined from the identity, or could be achieved by simply providing a location indication indicative of both the display system location and identity to the control system 150, with this being assigned to the respective controller as required. In either case, it will be appreciated that the display system 120 is to be associated with a particular controller and hence transmission system antenna 141 thereby ensuring that the content stream is transmitted to the correct display system 120. It will be further appreciated that this can be configured during an initial set up stage or dynamically each time a display system 120 is used.

In one example, the system further includes a plurality of encoders, each encoder compressing respective content stream to thereby generate a compressed content stream that is transmitted to the display system 120. Compressing the data reduces the volume of data that needs to be transmitted, thereby allowing the data to be easily wirelessly transmitted via available bandwidth using commonly available technologies such as 802.11ac or 802.11ad. In this instance, each display system 120 typically includes a decoder for decompressing the compressed content stream.

An example of a suitable compression scheme for use is described in co-pending applications, U.S. provisional patent application No. 62/351,738 and AU provisional patent application no. 2016905048, published as WO2017/214671, the contents of which are incorporated herein by cross reference.

Each display system 120 also typically includes a receiver that receives the content stream and a display processing device that causes the content stream to be displayed on the display.

In one particular example, the system 100 includes, for each display system 120, a content engine that generates the content stream, an encoder that encodes the content stream to thereby generate a compressed content stream, a transmission system antenna 141, a transmitter that transmits the compressed content stream via the transmission system antenna 141 and a controller that determines the location of the display system 120 from a location system and controls an orientation of the transmission system antenna 141 in accordance with the location of the display system 120. Thus, it will be appreciated that in this embodiment each display system 120 has dedicated hardware in the form of the content engine, encoder, antenna, transmitter and controller which operate to provide the content to the display device 120.1. This ensures that the content can be delivered with minimal latency which is important in VR and AR applications.

A further benefit of the above described arrangements is that these can be implemented in the form of a retrofit arrangement that can be implemented with existing VR or AR headsets.

Accordingly, in one broad form, the display system 120 includes a display device 120.1 and a processing device that causes the content stream to be displayed on the display device 120.1. This, together with an associated content system 110, corresponds to a traditional VR or AR system. Additionally, the system includes a receiver module that wirelessly receives the content stream from a transmission system, the transmission system including a number of antennas that transmit content to a plurality of wearable display systems and a location module that detects a signal from at least two of multiple beacons provided in the venue, calculates a position of the display system relative to the at least two beacons and transmits location data indicative of the location to a location processing device via a wireless communications system thereby allowing the location processing device to determine a location of the display system.

In this example, it will be appreciated that the receiver module can be attached to a display system input, allowing wirelessly received content to be provided to the display system for display on the headset. Additionally, the location module operates independently of the display system, interacting with a remote location processing device, allowing the location of the display system within the venue to be determined. It will be appreciated from this, that this allows the system to be easily fitted to an existing VR or AR headset system, without requiring modification of the VR or AR headset system or controlling electronics.

Thus the location system 130, transmission system 140 and control system 150 can be implemented as an add-on system, allowing these to operate with existing VR or AR headsets. Furthermore, whilst reference is made to separate location, transmission and control systems, it will be appreciated that this is for ease of reference, and that in practice these could be implemented using a single underlying hardware system.

It will be appreciated that the above described techniques can be applied to communications more broadly, for example to optimise communication between a mobile device and base station, and/or between two communications devices. In one example, this can be performed to allow the base station, mobile device or communications devices to communicate using beam steering and/or beam forming approaches, without the need to perform sweeps to maintain signal strength as the mobile device moves, thereby optimising transmission whilst reducing latency.

In one example, the process involves using a mobile device, such as a mobile phone, tablet, smart phone, wearable display device or the like, which includes a location module that determines a mobile device location relative to an environment. The mobile device further includes a mobile device transceiver having an antenna that transmits and receives signals and a mobile device processor that transmits a location indication indicative of the mobile device location via the mobile device transceiver. The base station includes a base station transmission system that transmits and receives signals to allow communication with the mobile device, with the base station transmission system including at least one base station antenna. A control system is provided that receives the location indication from the mobile device, via the base station transmission system, and uses this to determine the mobile device location. The mobile device location can then be used to selectively control either the base station or mobile device antenna in accordance with the mobile device location to thereby optimise communication between the base station and mobile device.

Thus, it will be appreciated that in the above described arrangement, an antenna control system of the base station uses the location of a mobile device, as determined by a location module forming part of the mobile device, in order to track the mobile device location and hence control one or more antennas either of the base station transmission system or the mobile device.

This can be used in order to allow directional and/or shaped transmissions, particularly allowing beam steering and/or beam forming to be performed, without requiring signal sweeps and an assessment of received signal strength, which can in turn result in increases in transmission latency, as well increases in interference with other devices.

Avoiding the need for sweeps is particularly important in digital reality applications, such as mixed, virtual and/or augmented reality, in which latency can have a significant impact on the user experience. In one particular example, this can assist in reducing transmission latency, allowing digital reality content to be generated in a distributed computing environment, such as a cloud based environment, whilst allowing the content to be transmitted to a wearable device, such as a dedicated wearable display system and/or smart phone, via a cellular communications network, such as a 5G network, without noticeable transmission latency.

Similarly, this can be used in other communications systems including first and second communications devices, each of which includes an antenna. In this example, a location system can be provided that determines a location of at least one of the first and second communications devices, with a control system being used to receive a location indication indicative of the location from the location system, determine a relative location of the first and second communications devices and selectively control a transmitting antenna of at least one of the first and second communications devices in accordance with the relative position to thereby optimise communication between the first and second communications devices.

In this example, the location system and/or control system could be provided on either or both of the communications devices. For example, each communications device could separately implement a location and control system, so that each communication device determines its own location and control its own antenna. For example, the location systems could determine the location of the communications device relative to an environment, and then exchange this with the other device, allowing a relative location to be determined. Alternatively, the location and/or control systems could be provided on one of the devices, such as a base station, or could be distributed between the devices. Irrespective of where these processes are performed, the approach is largely similar in that a relative position of the communications devices is determined using an independent location system, so that this does not need to rely on signal sweeps in order to ensure communication is optimised, thereby ensuring transmission quality is maintained, whilst reducing latency.

A number of further features will now be described.

In one example, the control system controls an antenna direction, for example by physically moving the antenna to track the mobile device and/or communications device, or performs beam steering and/or beam forming, to thereby control signal transmission. However, it will be appreciated that this is not essential and any suitable control of a transmission system could be performed, depending on the preferred implementation. For example, one of the first and second communications devices, including a base station and/or mobile device, could include a plurality of antennas, with the control system selecting a respective one of the plurality of antennas in accordance with the relative location.

Whilst the system could simply determine an instantaneous location of the mobile device, this is not essential and in one example, the control system tracks movement of a communications device or mobile device in accordance with the multiple location indications and controls the antenna in accordance with the movement. This can be used in a predictive manner, for example to anticipate a future location of the communication or mobile device, based on historical movement patterns, in turn allowing control to be performed synchronously with movement of the communication or mobile device. Thus, for example, the control system can determine relative movement of the first and second communications devices and controls a transmitting antenna in accordance with the relative movement, optionally in accordance with a predictive algorithm. The prediction could be based on information relating to content displayed on the display systems, for example anticipating movement based on an expected response to content being displayed, and/or based on models of human movement, for example to incorporate physical limitations for locomotion.

It will also be appreciated that tracking movement can have application in situations in which an absolute communication device or mobile device location is not known. In particular, in this situation standard sweep techniques could be used to allow periodic optimisation of signal transmission for a given mobile device location, with subsequent control of the antenna being performed based on movement of the mobile device from the respective location. In this instance, the control system typically determines a signal strength, determines an initial mobile device location in accordance with the signal strength and then determines a change in mobile device location in accordance with one or more location indications. Thus, the control system can use a traditional sweep approach to maximise a signal strength for an initial starting mobile device location, using information regarding movement of the mobile device from the initial starting location to perform adjustment of the antenna, for example to perform beam steering and/or forming. This can assist in reducing the frequency with which sweeping needs to be performed. This can also be used to guide beam steering/beam forming approaches, for example to minimise an area over which a sweep is performed in order to determine a maximum signal strength.

In this instance, it will be appreciated that calibration could be performed periodically to ensure tracking is resulting in optimal signal strength. It will also be appreciated that information regarding a received signal strength, and in particular a strength falling below a threshold could also be used to trigger a further sweep, thereby effectively performing calibration of movement tracking in the event that movement tracking is not functioning as required.

In one example, the location module includes a sensor and determines the communication or mobile device location in accordance with signals from the sensor. The sensor can be of any appropriate form depending on the preferred implementation. For example, the sensor could include a range sensor that determines a range of the communication or mobile device from an environment, for example using a simultaneous localization and mapping (SLAM) algorithm. It will be appreciated that this could be achieved in a wide range of manners, depending on the preferred implementation. For example, the sensor could be a laser range finder or LIDAR that measures the distance of the communication or mobile device from one or more objects in the environment. Alternatively, the sensor could include one or more image capture devices that use stereoscopic images, or multiple images captured from different device poses, in order to resolve a position of the communication or mobile device relative to the environment, as previously described.

The communication or mobile device could include a digital reality headset, for example forming part of the above described multi-player VR venue. However, this is not essential and more broadly the approach could apply to any mobile communications device, such as a smart phone, tablet or the like, which may or may not be forming part of a digital reality display system.

The above processes can also use processes described above with respect to the multiplayer venue application. For example, this allows occlusion or reflection mapping to be performed. In this instance, the control system can determine a relative location of first and second communications devices within an environment, retrieve an environment map, such as an occlusion or reflection map and control the transmitting antenna at least partially in accordance with relative location and the environment map, for example by controlling the antenna to select a transmission path to avoid an occlusion. Similarly, the control system can detect occlusion of a communications device, control an antenna to adjust a transmission direction to thereby re-establish communication with the communications device, determine a communications device location and update an occlusion map with the communications device location and the transmission direction.

The system can also be controlled in order to avoid interference with other communications devices, for example by determining a location of at least one other communications device and controlling the transmitting antenna in accordance with the location of the at least one other communications device. This can include selecting a communications channel to further reduce interference.

Where the first communications device is a static device, such as a base station, the control system can determine the relative location using the location of the second communications device and a known location of the first communications device, which can be determined during an initialisation process.

It will be appreciated from this that the mobile device and base station can communicate via a wide range of different communications protocols, including but not limited to a cellular communications protocol, a short range wireless communications protocol, a 5G network or the like. Similarly, the antenna could be a phased antenna array and/or a movable directional antenna, depending on the preferred implementation.

Figure 2A:
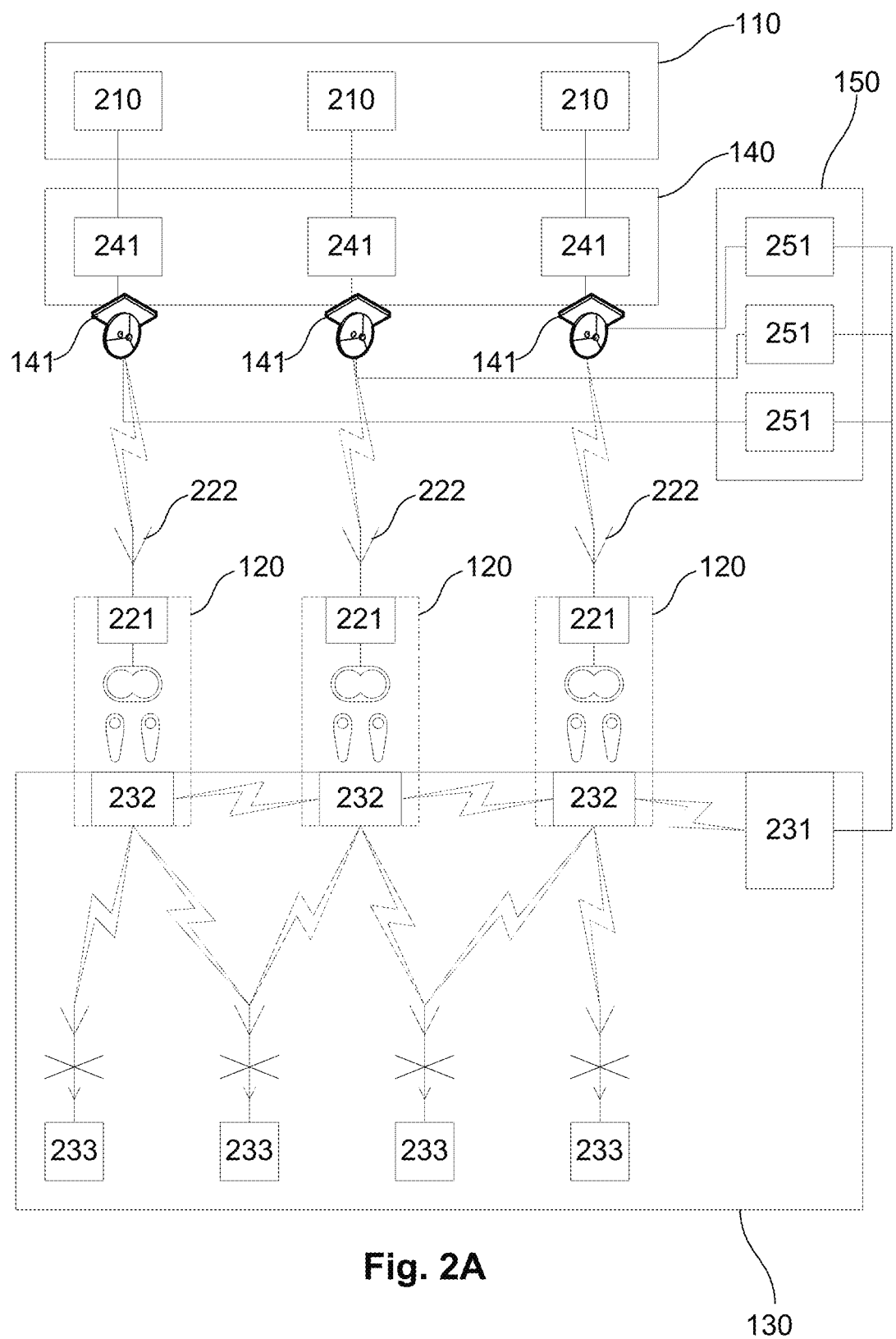
FIG. 2A is a schematic diagram of a second example of system for displaying content to a plurality of users in a multiplayer venue.
Figure 2B:
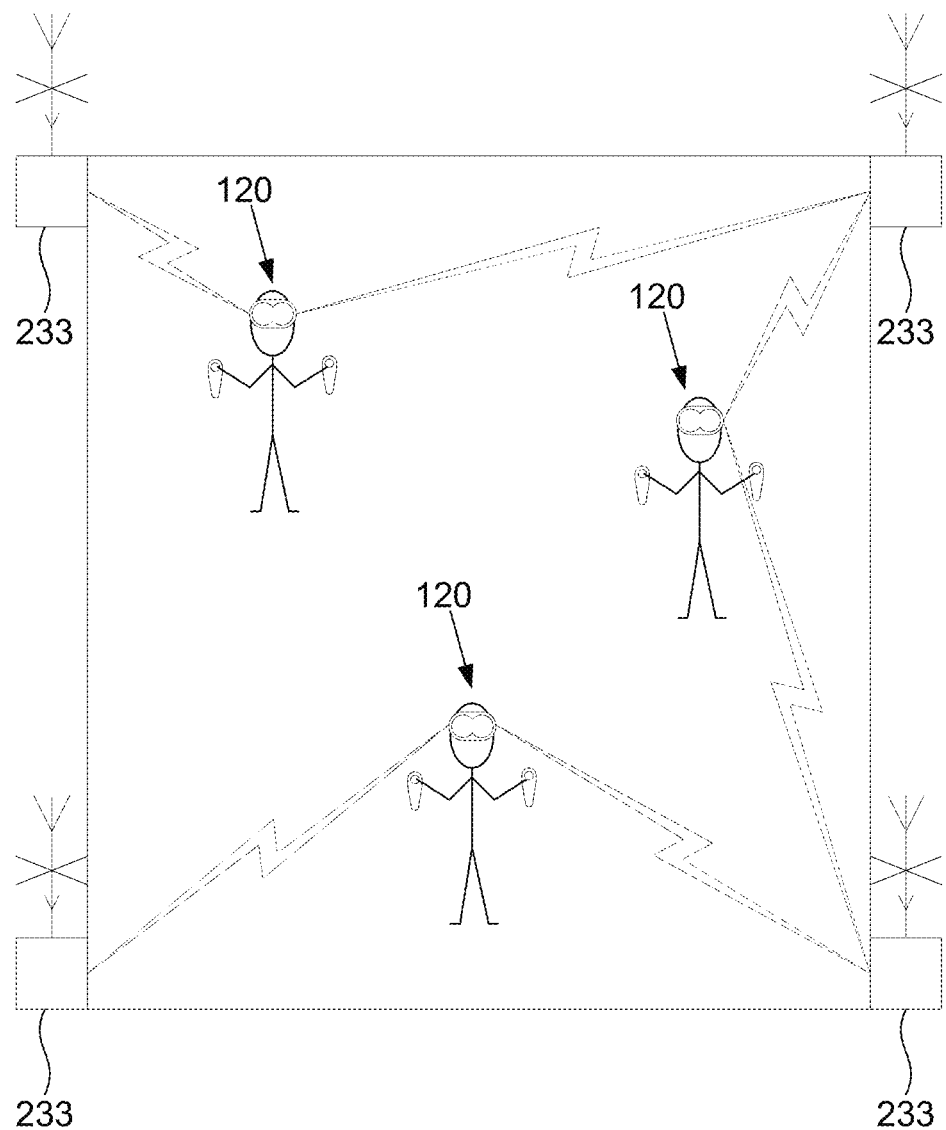
FIG. 2B is a schematic diagram showing an example of the positioning of beacons of the system of FIG. 2A.

A specific example of a system for use in providing a multiplayer VR or AR experience in a venue will now be described with reference to FIG. 2A and FIG. 2B. However, it will be appreciated that similar arrangements can be used for allowing communication with communications devices, such as mobile devices, more generally.

For the purpose of this example, reference is made to three display systems 120, but it will be appreciated that this is for the purpose of illustration only and in practice the system is scalable to any number of display systems 120 that may be practically used within a given venue 101.

In this example, the content system 110 includes a plurality of content engines 210. The nature of each content engine 210 will vary depending on the preferred implementation but typically this would include a combination of hardware and/or software systems operating to generate AR or VR content, optionally on the basis of signals received from the display systems 120, and any associated hardware, such as associated base stations.

The system further includes the transmission system 140 which includes a dedicated transmission module 241 for each transmission system antenna 141. The transmission module 241 can be adapted to perform suitable encoding of the content stream prior to transmission via the transmission system antennas 141. The transmission modules 241 can include a combination of hardware and/or software components and in one example includes a dedicated encoder, an example of which will be described in more detail below. The transmission system antennas 141 are typically directional antennas, such as antennas suitable for use in an 802.11ac or 802.11ad wireless transmission system whose directionality can be adjusted. This can include using movable antennas whose orientation can be adjusted and/or antennas including electronic beam steering/beam forming. It will therefore be appreciated that reference to the orientation of an antenna should be understood to encompass a physical orientation and/or effective orientation as controlled through beam forming or other appropriate processes.

The transmission system antennas 141 are controlled by the control system 150 which includes a dedicated controller 251 for each transmission system antenna 141, which is typically a hardware and/or software based controller for controlling the antenna orientation.

Each transmission system antenna 141 is adapted to transmit the compressed content stream to a respective wearable display system 120 which typically includes a transceiver module 221 coupled to one or more display system antennas 222 allowing the compressed content stream to be received and decoded before being provided to the display device 120.1 for display in the normal way.

The location system 130, which is used to determine the location of each wearable display system 120 typically includes a location processing system 231, which is in wireless communication with a number of location modules 232, with a respective location module 232 being provided for each display system 120. The location modules 232 receive signals from a number of beacons 233 which are positioned around the venue 101, as shown for example in FIG. 2B. The location modules 232 determine a position of the respective wearable display relative to the beacons, transmitting this information via a mesh network to the location processing system 231 which determines a respective location of the display system, transferring this to the respective controller 251 as shown.

Thus, it will be appreciated that the above system includes a multiple channel arrangement, with each content channel including a respective content engine, controller and antenna, allowing content to be transmitted to a corresponding display system. This arrangement allows content to be provided to multiple display systems in parallel, assisting with scalability.

An alternative configuration will now be described with reference to FIG. 2C. For the purpose of this example, only a single content channel is shown, but it will be appreciated that this is for the purpose of ease of illustration only, and that in practice multiple channels will be used. Furthermore, similar reference numbers to those used in FIG. 2A are used to refer to similar features, and these will not therefore be described in detail.

It will be appreciated from this that the system includes a content system 110 having a content engine 210 for each channel. The transmission system 140 includes a dedicated transmission module 241 for the channel, with this being connected to multiple transmission system antennas 141, via a multiplexer 242, or other similar signal routing arrangement. In this example, the transmission system antennas 141 are directional antennas having a defined field of view, with the multiple transmission system antennas 141 for the channel being provided so as to provide coverage over the entire venue. In this example, the multiplexer 242 is used to control the transmission system antenna 141 to which content is provided, allowing the content to be transmitted to the respective display system 120. To achieve this, the multiplexer 242 is controlled by the control system 150 which includes a dedicated controller 251 for each multiplexer 242 and hence each channel.

In use, the location system 130 is used to determine the location of each wearable display system 120, with the controller 251 then controlling the multiplexer 242 to ensure content is transmitted by the most appropriate transmission system antenna 141.

In this example, transmission of data from the display system 120, such as transmission of location data, occurs via the same channel via which content is received, with the data being transmitted via the transceiver 221 and antenna 222 to the transmission system antenna 141. In the event that the data includes location data, the transmission system 140, passes this on to the location processing system 231. Additionally, the display system 120 includes a controller 252, which operates to control the display system antenna 222, allowing this to be controlled using appropriate control techniques, such as switching between different ones of multiple display system antennas 222, or by using beam forming/steering using a phased antenna array.

Whilst the above examples describe the use of multiple antennas per channel and controllable antennas, it will be appreciated that these approaches are not mutually exclusive and could be employed in combination. For example, if the venue is large, it could be that multiple movable antennas are provided for each channel, each covering a respective area so that the antenna used switches as the user moves between areas, and each antenna being controllable so that an orientation of directionality is adjusted based on the location of the wearable system within the respective area.

Figure 3:
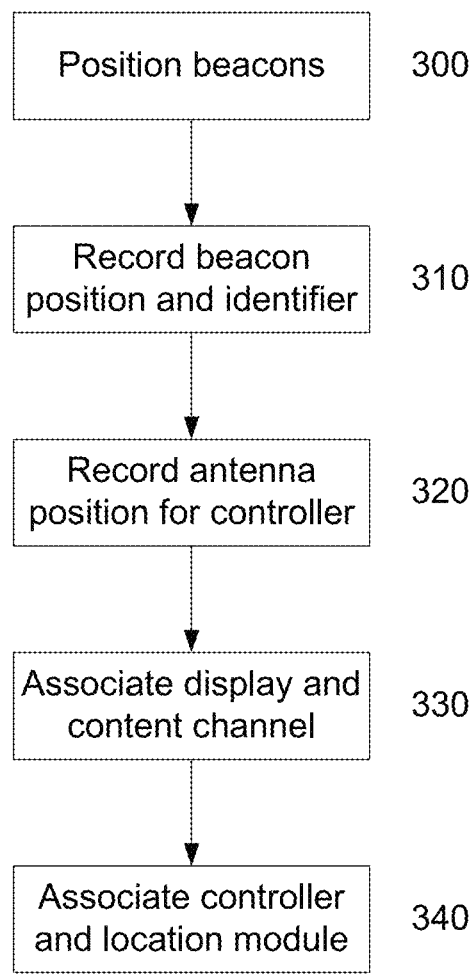
FIG. 3 is a flow chart of an example of a process for configuring the system of FIG. 2A.

An example of the process for configuring the above described system will now be described with reference to FIG. 3.

In this example, at step 300, when the venue is initially set up, beacons 233 are installed at respective locations within the venue, with an indication of the beacon location and beacon identifier of each beacon being recorded at step 310. This information is typically recorded as beacon data in a respective database that is accessible by the location processing system 231.

At step 320, a position of a dedicated antenna for each controller is recorded. In this regard, the position of the transmission system antenna 141 within the venue is required in order to ensure the controller is able to accurately track the display system 120, and in particular generate control signals to move the antenna to the correct position as the user moves.

At step 330, each display system 120 is associated with a respective content channel. In this regard, the display system 120 is typically registered with a respective content engine, to ensure the content stream is provided to the correct display system 120.

At step 340, the location module 232 of the display system 120 is associated with the controller 251 of the same content channel, so that this can be used to ensure the location of the display system 120 to which content is transmitted is correctly identified. In one example, this is achieved by creating an association between an identifier of the location module 232 attached to the display system 120 and the corresponding controller 251, with an indication of the association being recorded as registration data in a respective database that is accessible by the location processing system 231.

It will be appreciated however that as an alternative the display system 120 can incorporate ranging sensors and/or imaging devices, with location data being based on sensed environment. This can then be used with a SLAM algorithm implemented by the location processing system 231, allowing a display device location to be derived.

Figure 4:
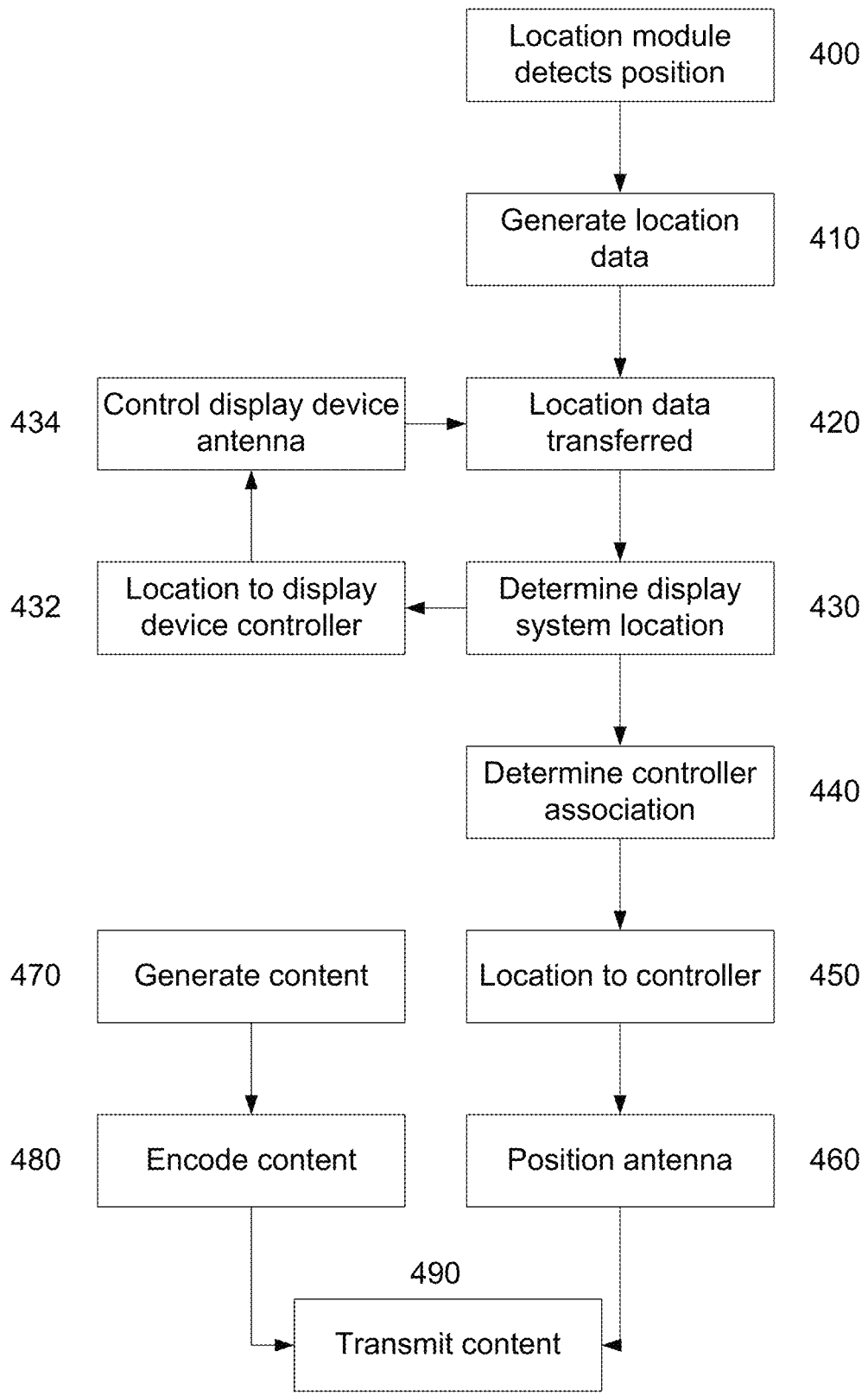
FIG. 4 is a flow chart of an example of operation of the system of FIG. 2A.

An example of the process for delivering content will now be described with reference to FIG. 4.

In this example, at step 400, the location module 232 of a display system 120 detects a position of the display system and generates location data at step 410. In this example, the location of the display system is determined relative to the beacons 233, in which case the location data is typically indicative of an identifier associated with each beacon, the position relative to the beacon, such as the direction and/or distance of the beacon and an identifier of the location module. However, it will be appreciated that in the event that other forms of localisation are performed, such as using on-board sensors to detect the surrounding environment, this could include images and/or range data.

The location data is transferred to the location processing system 231 at step 420. In the example of FIG. 2A, this is performed via a mesh network established between the location modules 232, allowing the location data to be transferred directly to the location processing system 231. Alternatively, in the example of FIG. 2C, this is achieved by transmitting the location data via the display device transceiver 221 and antenna 222, to the transmission system antenna 141 and transmission system 140, with the location data then being routed to the location processing system 231. In either case, this allows the location processing system 231 to determine the location of the display system within the venue at step 430. In particular, the processing system 231 uses the beacon identifiers to determine the beacon locations from the beacon data, before calculating the location based on the position relative to the beacons, or uses a SLAM algorithm as appropriate.

Figure 2C:
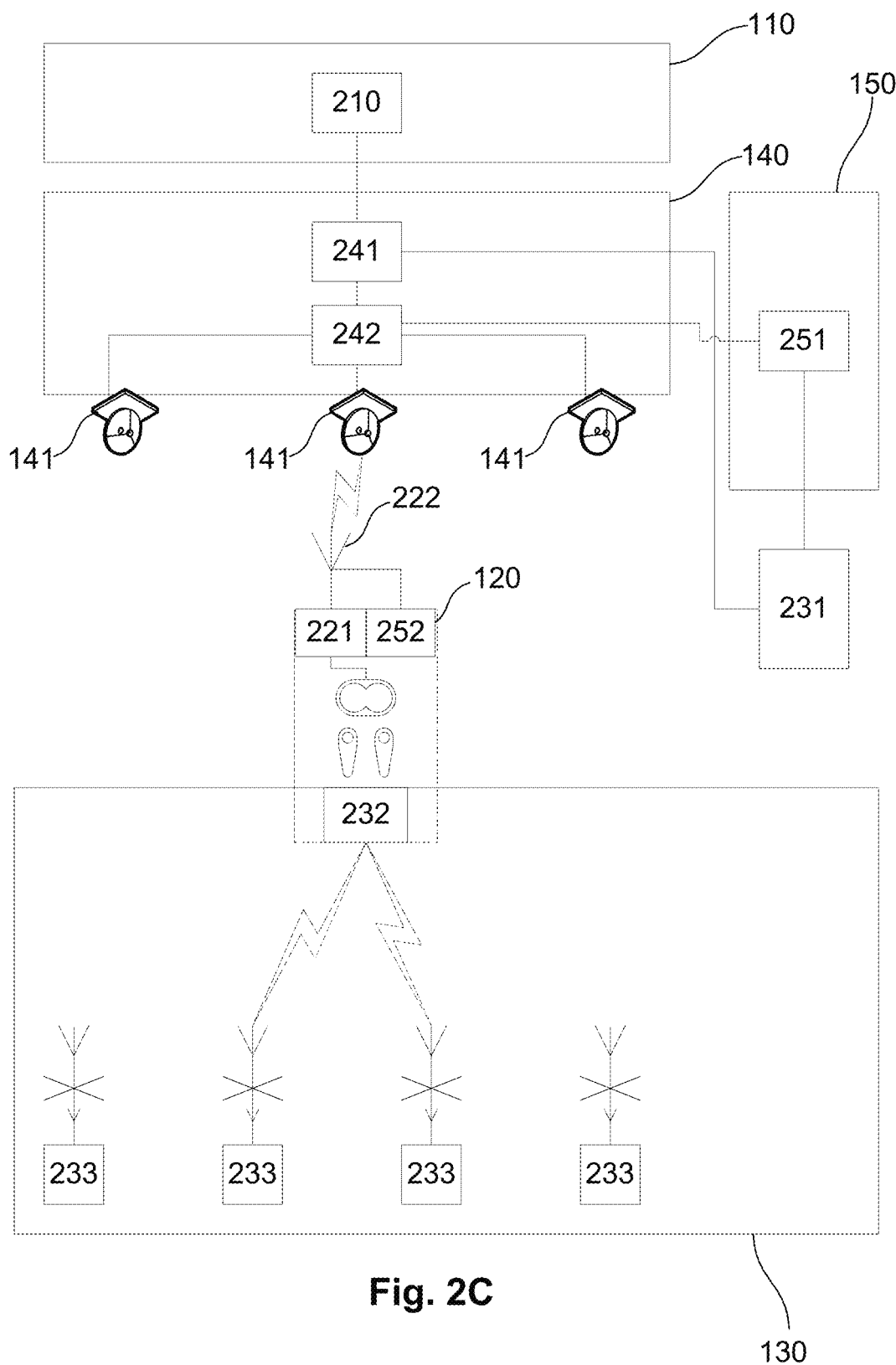
FIG. 2C is a schematic diagram of an alternative second example of system for displaying content to a plurality of users in a multiplayer venue.

In the example arrangement of FIG. 2C, in which the display device antenna 222 is to be controlled, the location of the display device relative to the transmission antenna 141 is transmitted to the display device at step 432, allowing the controller 252 to control the display device antenna 222 at step 434. Specifically, this will involve controlling the direction and/or beam shape so that transmissions are directed at the transmission system antenna 141, thereby optimising the transmission of location and other data, whilst avoiding interference with other display devices.

At step 440, the processing system 231 determines the controller 251 to which the location should be provided, based on the registration data and the location module identifier. The location is then provided to the respective controller at step 450, allowing the controller to calculate any required change in antenna position/beam shape and control the position/beam shape of the antenna accordingly at step 460.

Simultaneously with this process, at step 470, the content engine generates a next part of a content stream, which is encoded at step 480 and transmitted via the corresponding antenna at step 490. This process is repeated continuously, so that the content stream is transmitted via an antenna directed at the display system 120 as the display system moves within the venue.

Figure 5:
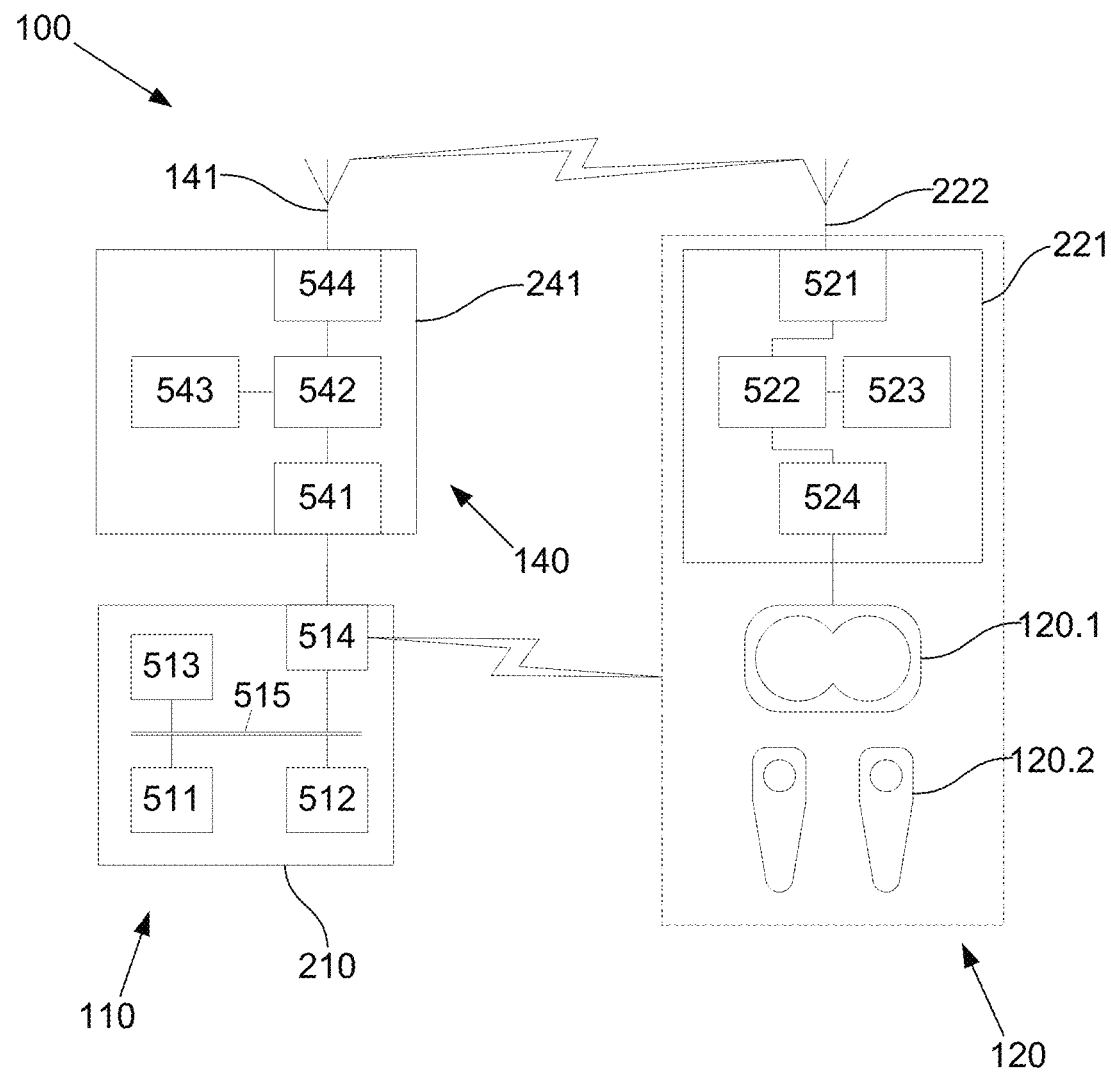
FIG. 5 is a schematic diagram showing an example of a transmission system for the system of FIG. 2A.

An example of the content generation and transmission systems will now be described in more detail with reference to FIG. 5.

In this example, the content for each display system is generated by a respective content engine 210, which typically includes a processing system including at least one microprocessor 511, a memory 512, an optional input/output device 513, such as a keyboard and/or display, and an external interface 514, interconnected via a bus 515 as shown. In this example the external interface 514 can be utilised for connecting the content engine 210 to peripheral devices, such as communications networks, storage devices, peripherals, or the like. Although a single external interface 514 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like, as well as a wireless connection to the headset 120.1 and/or associated controllers 120.2.

In use, the microprocessor 511 executes instructions in the form of applications software stored in the memory 512 to allow the required processes to be performed, and in particular allowing content to be generated based on signals from the headset 120.1 and/or associated controllers 120.2, and optionally other peripheral devices, such as base stations in the Vive™ VR system. The applications software may include one or more software modules, and may be executed in a suitable execution environment, such as an operating system environment, or the like.

Accordingly, it will be appreciated that the processing system 210 may be formed from any suitable processing system, such as a suitably programmed PC, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Furthermore, whilst the processing system 210 is shown as a single entity, it will be appreciated that in practice the processing system 210 could be formed from multiple physical devices, which can optionally be distributed over a number of geographically separate locations, for example as part of a cloud based environment.

The processing system 210 outputs a content stream, which is transmitted to the transmission system 140. The transmission system 140 includes an input interface 541, encoder 542 and optional memory 543 and a transmitter 544. In use, the content stream is received by the input interface 541 and passed to the encoder 542, which operates to compress content stream, optionally in accordance with an encoding scheme stored and/or other instructions stored in the memory 543. Operation of the encoder 542 will be described in more detail below with reference to FIG. 9.

The compressed data is transferred to the transmitter 544, which formats the compressed content stream for transmission, and generates signals that are transmitted via the transmission system antenna 141 in accordance with a wireless communications protocol such as 802.11ac or 802.11ad. The compressed data is received by the display system antenna 222, and transferred to the transceiver module 221. The transceiver module 221 includes a receiver 521, a decoder 522 and optional memory 523 and an output 524. In use, the receiver 521 converts the received signals into a compressed content stream, which is then passed to the decoder 522, which decodes the compressed content stream to form an uncompressed content stream. This is typically performed in accordance with a compression scheme stored in the memory 523, and an example of operation of the decoder 522 will be described in more detail below with reference to FIG. 9. The decompressed image stream is then provided to the output 524, which is typically an HDMI, display port or other similar interface, which connects directly to a corresponding input on the headset 120.1, allowing the content stream to be provided to and displayed by the headset 120.1.

Figure 6:
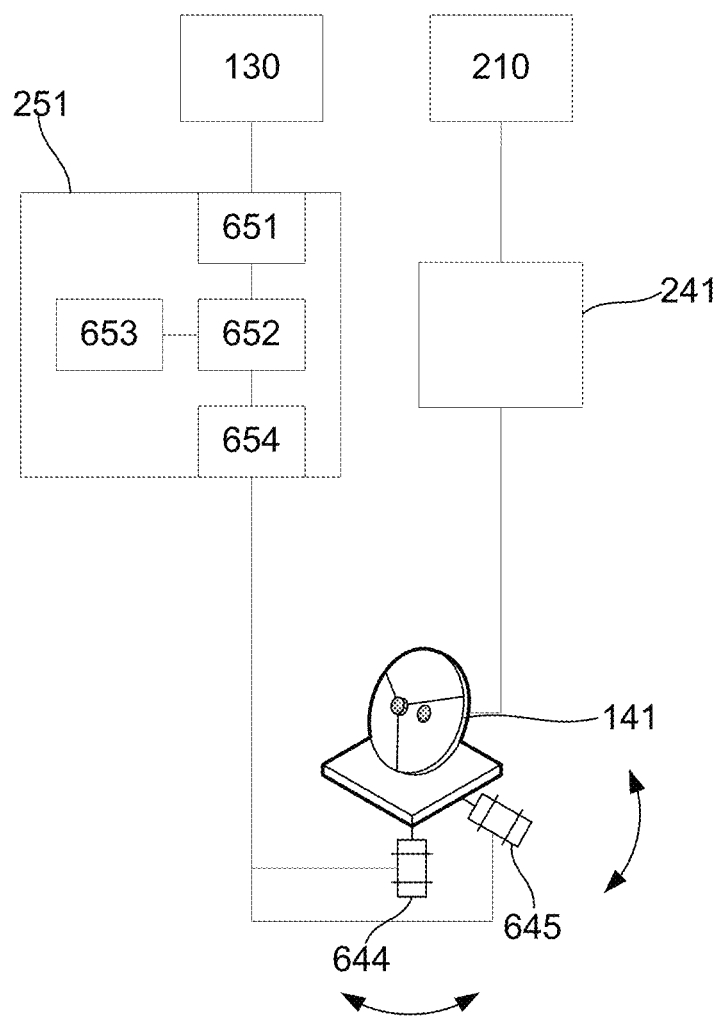
FIG. 6 is a schematic diagram of an example of a control system for the apparatus of FIG. 2A.

An example of a control system will now be described in more detail with reference to FIG. 6.

In this example, each controller 251 is connected to motors 644, 645 mounted on a respective antenna stage, which are adapted to control a pan and tilt of the antenna. Each controller 251 includes a controller input 651, controller processor 652, controller memory 653 and controller output 654.

In use, the controller input 651 receives an indication of the location of a respective display system 120 from the location system 130, providing this to the controller processor 652. The controller processor 652 uses the location of the corresponding display system 120, and a known position of the transmission system antenna 141 within the venue to determine a desired orientation of the transmission system antenna 141, generating control signals for controlling the motors 644, 645 accordingly, based on instructions stored in the memory 653. The control signals are provided via the output 654 thereby controlling the motors 644, 645.

Accordingly, in use, the controller processor 652 executes instructions in the form of applications software stored in the memory 653 to allow the motor control signals to be generated and provided via an output, such as an interface. Accordingly, it will be appreciated that the controller 251 may be formed from any suitable controller, such as a suitably programmed processing system, electronic processing device such as a microprocessor, microchip processor, logic gate configuration, firmware optionally associated with implementing logic such as an FPGA (Field Programmable Gate Array), or any other electronic device, system or arrangement.

Figure 7A:
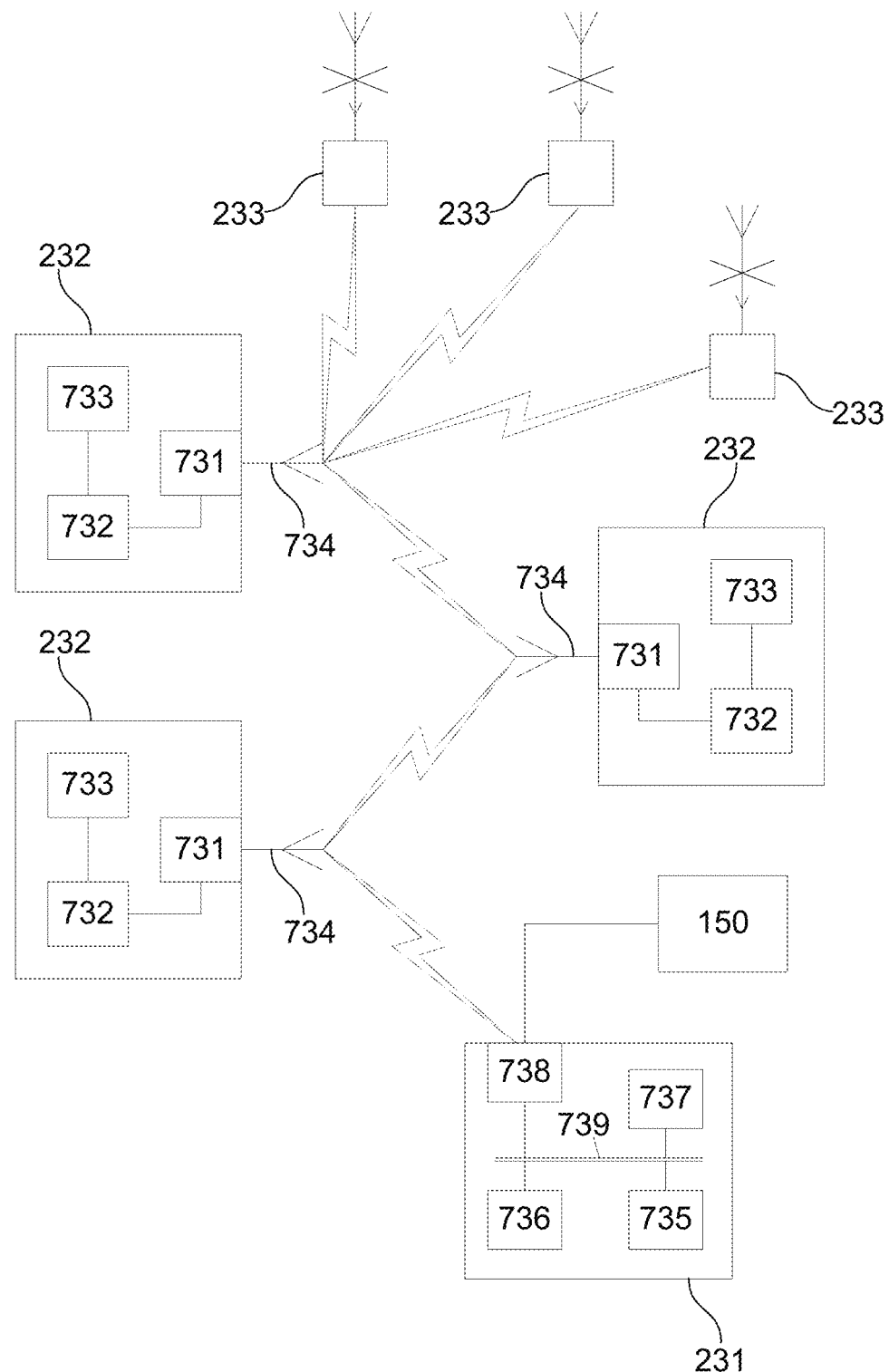
FIG. 7A is a schematic diagram of an example of a location system for the system of FIG. 2A.

An example of a location system for the system of FIG. 2A will now be described in more detail with reference to FIG. 7A.

In this example, the location system includes a number of location modules 232 each including a location module transceiver 731 coupled to a location module antenna 734, a location module processor 732 and a location module memory 733.

Beacons 233 are provided which broadcast signals including an indication of a beacon identifier indicative of a beacon identity, with the signals being detected by the location modules 232.

In particular, signals from the beacons 233 are received by the location module transceiver 731 and passed to the location module processor 732 for analysis. The location module processor 732 analyses the signals, in accordance with instructions in the location module memory 733, to determine the beacon identifier and an indication of a position of the display system 120 relative to the beacon, for example based on a signal strength and/or time of flight. The location module processor 732 then generates location data indicative of the position relative to each beacon, the beacon identity of each beacon and a location module identifier indicative of the identity of the location module, transferring this to the location processing system 231. In one particular example this is achieved using a mesh network established by the location module 232.

Accordingly, it will be appreciated that the location module 232 may be formed from any suitable wirelessly enabled processing system, including an electronic processing device such as a microprocessor, microchip processor, logic gate configuration, firmware optionally associated with implementing logic such as an FPGA (Field Programmable Gate Array), or any other electronic device, system or arrangement.

Similarly, the beacons can be of any appropriate form and can include any suitable wireless locator beacon, such as a Bluetooth Low Energy beacon, that is capable of generating a signal from which a position can be derived, and examples of these are known in the art.

The location data is provided to the location processing system 231, which typically includes at least one microprocessor 735, a memory 736, an optional input/output device 737, such as a keyboard and/or display, and an external interface 738, interconnected via a bus 739 as shown. In this example the external interface 738 can be utilised for connecting the location processing system 231 to the mesh network and the control system 150, for example via one or more communications networks or the like. Although a single external interface 738 is shown, this is for the purpose of example only, and in practice multiple interfaces using various methods (eg. Ethernet, serial, USB, wireless or the like) may be provided.

In use, the microprocessor 735 executes instructions in the form of applications software stored in the memory 736 to allow the required processes to be performed. The applications software may include one or more software modules, and may be executed in a suitable execution environment, such as an operating system environment, or the like.

Accordingly, it will be appreciated that the location processing system 231 may be formed from any suitable processing system, such as a suitably programmed PC, server, or the like. In one particular example, the location processing system 231 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

In use the location processing system 231 receives the location data from each location module 232, and uses this to determine the location of the corresponding display system. To achieve this, the location processing system 231 uses the beacon identifiers to determine a location of each beacon within the venue, which is typically established during an initial configuration process, with corresponding data being stored in a database for subsequent look-up. The location processing system 231 then uses the position relative to each beacon and the beacon locations, to determine the location of the display system within the venue. Following this, the location processing system 231 uses an association between the location module identifier and a respective controller 251, to thereby determine the controller 251 used to control the antenna for the respective display system 120. This allows the location processing system 231 to provide the relevant location to the controller 251, thereby allowing the controller to control the antenna position.

Figure 7B:
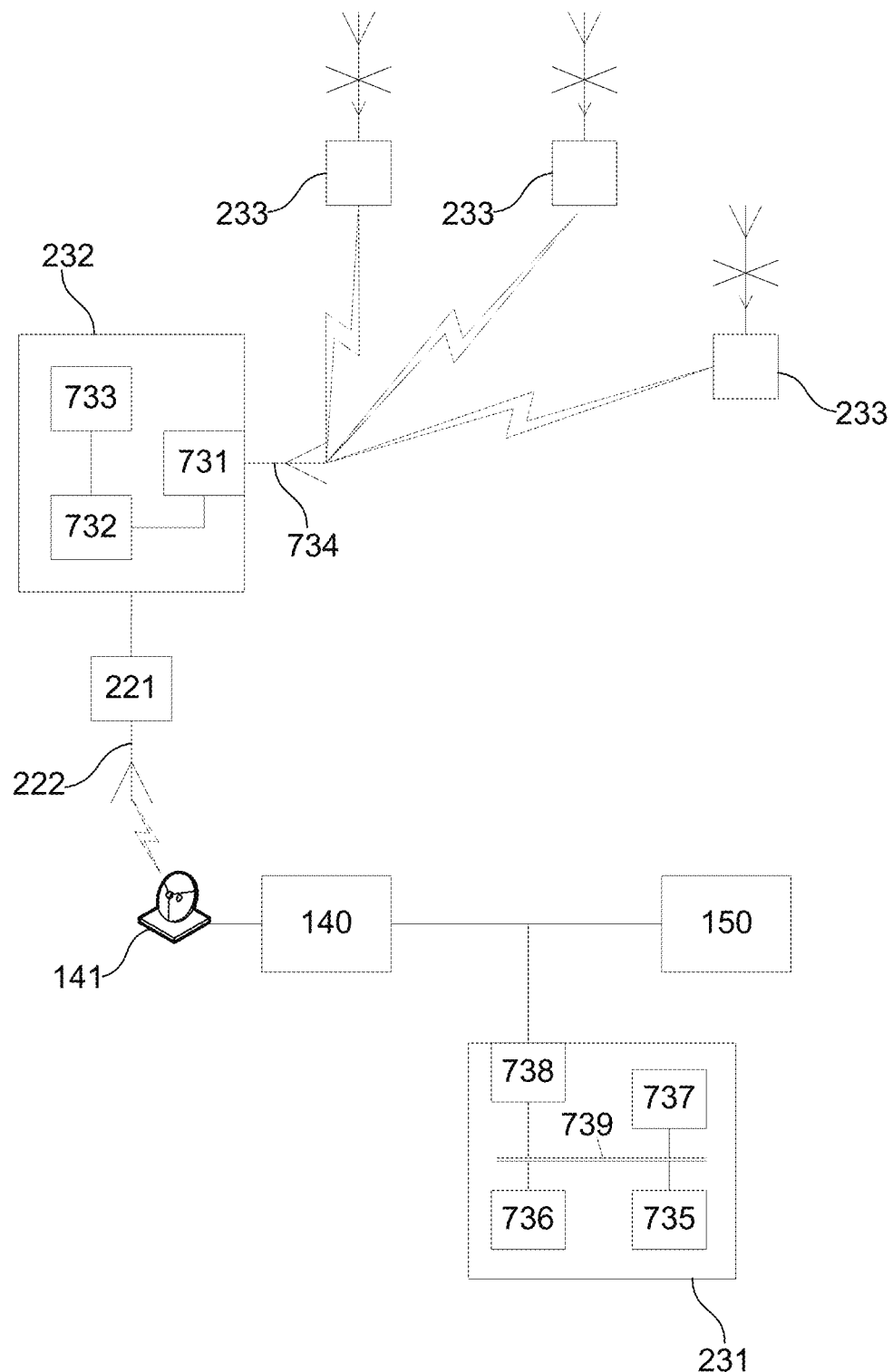
FIG. 7B is a schematic diagram of an example of a location system for the system of FIG. 2C.

An example of a location system for the system of FIG. 2A will now be described in more detail with reference to FIG. 7B.

In this example, the location system is generally similar to that described above with respect to FIG. 7A and uses similar reference numerals to denote similar features, which will not therefore be described in further detail.

In this example however, the location module 232 is coupled to the display system transceiver 221 and antenna 222, allowing location data to be transmitted to the location processing system 231, via the transmission system antenna 141 and transmission system 140.

Figure 8:
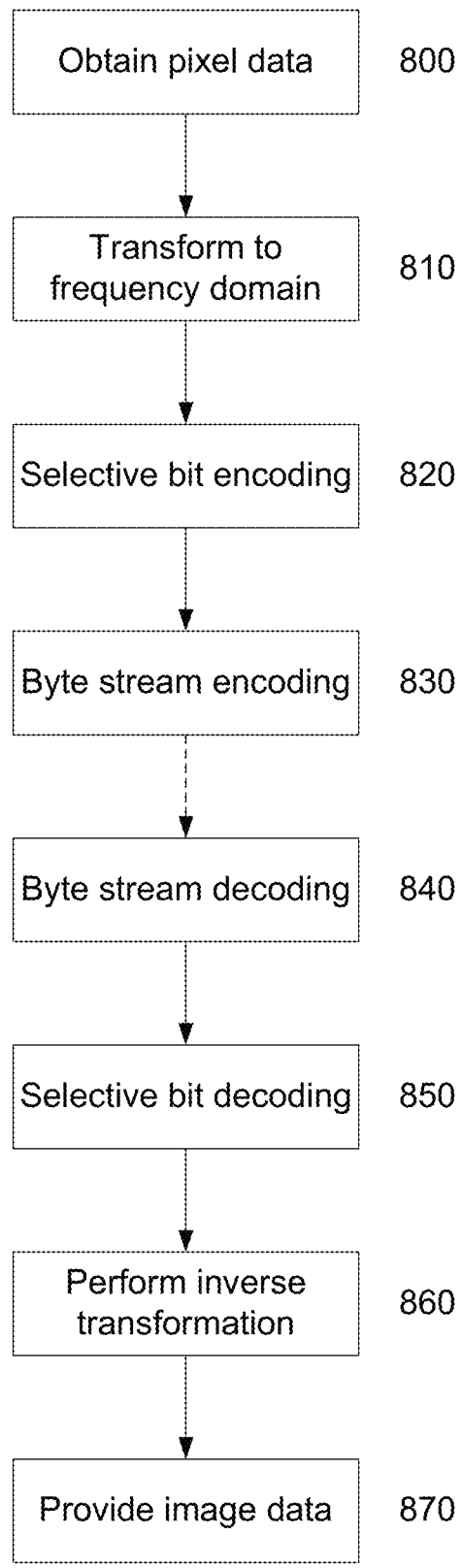
FIG. 8 is a flow chart of an example of an encoding process.

An example of a method for encoding and decoding a content stream by compressing and subsequently decompressing image data will now be described with reference to FIG. 8.

In this example, at step 800 pixel data is obtained from image data, with the pixel data representing an array of pixels within the one or more images. The pixel data can be obtained in any appropriate manner, depending on the format of the image data. In one example, this is achieved simply by selecting a particular sequence of bytes from within the image data. The array of pixels typically corresponds to a set number of pixels, such as an 8×8 block of pixels from within one of the images, although other arrays of pixels could be used.

At step 810, a transformation is applied to the pixel data to determine a set of frequency coefficients indicative of frequency components of the array of pixels. The transformation is therefore typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

At step 820, at least some of the frequency coefficients are selectively encoded using a bit encoding scheme to thereby generate a set of encoded frequency coefficients. The bit encoding scheme defines the number of bits used to encode each frequency coefficient, with the frequency coefficients being selectively encoded so that at least some of the encoded frequency coefficients have different numbers of bits and at least one frequency coefficient is discarded so that the set of encoded frequency coefficients is smaller than the set of frequency coefficients.

This process could be achieved in any suitable manner, and could include discarding some of the frequency coefficients, and then encoding the remaining frequency coefficients with different numbers of bits, to thereby minimise the number of bits required to encode the frequency coefficients. Alternatively, the process could include encoding some of the frequency coefficients with zero bits, thereby effectively discarding the respective frequency coefficients as part of the encoding step.

The particular frequency components that are discarded will vary depending on the preferred implementation. Typically the higher frequency components are discarded as their magnitude is smaller and as these correspond to sharp transitions within images, meaning their contribution to the overall image quality is less. This allows higher frequency component coefficients to be discarded without adversely effecting perceived image quality in a noticeable manner. In addition to discarding frequency components corresponding to higher frequencies, the process can encode frequency coefficients for higher frequency components with less bits, thereby reducing the overall number of bits required to encode the frequency coefficients.

Once encoding has been performed, compressed image data can be generated at step 830, using the encoded frequency coefficients. For example, this can be performed by creating a byte stream including sequences of the encoded frequency coefficients, optionally with additional information, such as flags or other markers, to identify the start of a new image, or the like.

Accordingly, the above described process allows compressed image data to be created by selectively encoding frequency coefficients using a bit encoding scheme that discards at least some of the frequency coefficients and encodes the remaining coefficients using different numbers of bits, for example depending on the magnitude of the frequency coefficient. Thus, smaller magnitude coefficients can be encoded using a smaller number of bits without any loss in information. By using a bit encoding scheme that defines the number of bits used to encode each frequency coefficient, this allows the same scheme to be used in decompressing the compressed image data, in turn allowing accurate decompression to be performed, whilst allowing the bit encoding scheme used to be configured to optimise the compression for the current situation.

In this regard, at step 840 a set of encoded frequency coefficients are determined from the compressed image data in accordance with the bit encoding scheme. In particular, information regarding the number of bits used to encode each frequency coefficient allows the received compressed image data to be segmented into the encoded frequency coefficients by selecting the next number of bits that makes up the next frequency coefficient.

At step 850, selective bit decoding of the encoded frequency coefficients is performed in accordance with the bit encoding scheme, to thereby generate a set of frequency coefficients. In this regard, this is performed to convert each encoded frequency coefficient into a frequency coefficient and additionally to generate frequency coefficients that were discarded during the encoding process. In particular this is typically performed to generate frequency coefficients with null values to thereby recreate a full set of frequency coefficients.

Following this an inverse transformation can be applied to the set of frequency coefficients to determine pixel data representing an array of pixels within the one or more images. In particular, this is typically in the form of an inverse frequency transformation, such as an inverse Fourier transform, 2D IDCT (Inverse Discrete Cosine Transform), or the like.

Accordingly, the above described process allows image data to be encoded by selectively encoding frequency coefficients using a bit encoding scheme and then subsequently using the same bit encoding scheme to decode the encoded frequency coefficients. Furthermore, the bit encoding scheme used can be adaptive and can depend on a wide range of criteria, such as the nature of the image data being encoded, the particular channel being encoded, or the like. This allows the bit encoding scheme to be applied to thereby maximise the amount of compression that can be achieved.

In addition to the above described advantages, the scheme can be implemented in a highly parallel manner, for example, allowing each of the frequency coefficients to be encoded in parallel. This in turn enables the process to be performed rapidly, thereby reducing latency, which is important in many applications, such as virtual reality applications, in which images are created in response to movement of a display device and must be transmitted rapidly to the display device for display.

Figure 9:
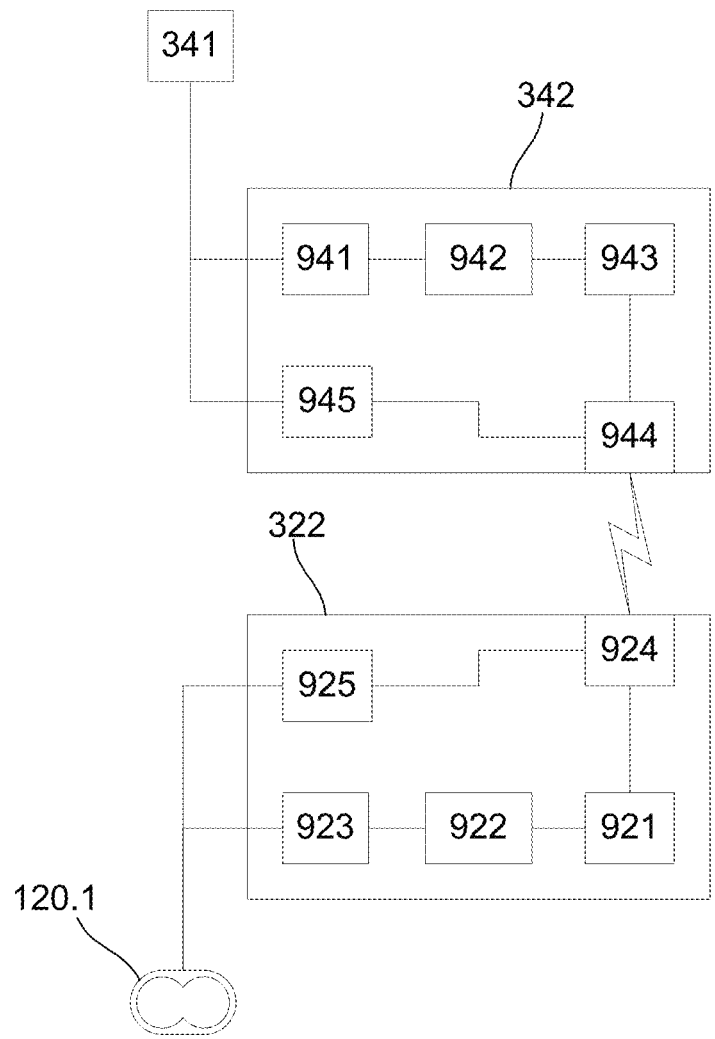
FIG. 9 is a schematic diagram of an example of an encoding system.

An example of the encoding and decoding system will now be described with reference to FIG. 9.

The encoder 342 typically includes an encoder input buffer 941, coupled in turn to an encoder processing device 942, an encoder output buffer 943, and a transceiver 944. A separate data buffer 945 can be provided coupled to the transceiver 944.

In use, image data, and in one particular example, content stream is received and temporarily stored in the input buffer 941, before being passed to the encoder processing device 942 for compression. In this regard, the encoder input buffer typically buffers image data corresponding to a next seven rows of pixels of the image, and then a next eight pixels of the next row of pixels. This allows the encoder processing device 942 to obtain pixel data for a next 8×8 block of pixels from the buffered image data, and commence encoding.

Once this has been done a next eight pixels are buffered, with this being repeated until pixel data from the first eight rows of pixels has been obtained and is being encoded. This process is then repeated for subsequent rows of pixels in the image, until pixel data is acquired for the entire image, at which point a next image is processed in a similar manner. As a result of this approach, the encoder input buffer need never store more than seven rows and eight pixels of image data, reducing memory requirements. Additionally, as pixel data is acquired, this can be immediately processed using the encoding process, even before the next eight pixels of image data are buffered. This significantly reduces processing time and helps minimise overall latency.

The resulting compressed image data is then stored in the encoder output buffer 943, for example by sequentially reading in encoded bits, to thereby perform parallel to serial byte encoding, before being transferred to the decoder 322, via the transceiver 944. The transceiver 944 is also adapted to transfer other data, such as a sensor data received from the HMD, via the encoder data buffer 945.

The buffers 941, 943, 945 can be of any appropriate form of temporary storage, depending on the preferred implementation, and in one example can include high-performance FIFO (First-In-First-Out) field memory chips, or the like. The input buffer 941 is typically connected to an HDMI port, whilst the data buffer 945 is connected to a USB port, thereby allowing equivalent connection to the computer system.

The transceiver 944 can be of any appropriate form, but in one example allows for short range radio based communication between the encoder and decoder, for example via a point to point direct WiFi™ connection, 60 GHz wireless technology, or the like.

The processing device 942 can be any device capable of performing the compression process described herein. The processing device 942 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), or any other electronic device, system or arrangement. In a preferred example, the encoder processing device 942 is configured to perform parallel processing of individual channels, of each DCT and parallel encoding of the individual frequency coefficients. Thus, whilst a single encoder processing device 942 is shown, in practice, a respective encoder processing device 942 could be provided for encoding each of the channels in parallel. In the event that a channel, such as the Y channel, is not encoded, then the encoder processing device may simply introduce a delay in transmitting the respective data to the encoder output buffer 943, ensuring this is still synchronised with the encoded CbCr channels.

The decoder 322 typically includes a transceiver 924 coupled to a decoder input buffer 921, in turn coupled to a decoder processing device 922 and a decoder output buffer 923. A separate data buffer 925 can also be provided coupled to the transceiver 924.

In use, compressed image data is received from the encoder 342 via the transceiver 924, and temporarily stored in the input buffer 921, before being passed to the decoder processing device 922 for decompression. The resulting image data is then stored in the decoder output buffer 923, before being transferred to the display device 120. The transceiver 924 is also adapted to transfer other data, such as a sensor data received from the display device 120.1, via the decoder data buffer 925.

The buffers 921, 923, 925 can be of any appropriate form of temporary storage, depending on the preferred implementation, and in one example can include high-performance FIFO (First-In-First-Out) field memory chips, or the like. The output buffer 923 is typically connected to an HDMI port, whilst the data buffer 925 is connected to a USB port, thereby allowing equivalent connection to the display device.

The transceiver 924 can be of any appropriate form, but in one example allows for short range radio based communication between the encoder and decoder, for example via a point to point direct WiFi™ connection, 60 GHz wireless technology, or the like.

The processing device 922 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), or any other electronic device, system or arrangement. In a preferred example, the decoder processing device 922 is configured to perform parallel processing of individual channels, of each DCT and parallel encoding of the individual frequency coefficients. Again, whilst a single decoder processing device 922 is shown, in practice, a respective encoder processing device 942 could be provided for encoding each of the channels in parallel. In the event that a channel, such as the Y channel, is not encoded, then the decoder processing device may simply introduce a delay in transmitting the respective data to the decoder output buffer 923, ensuring this is still synchronised with the CbCr channels.

Figure 11:
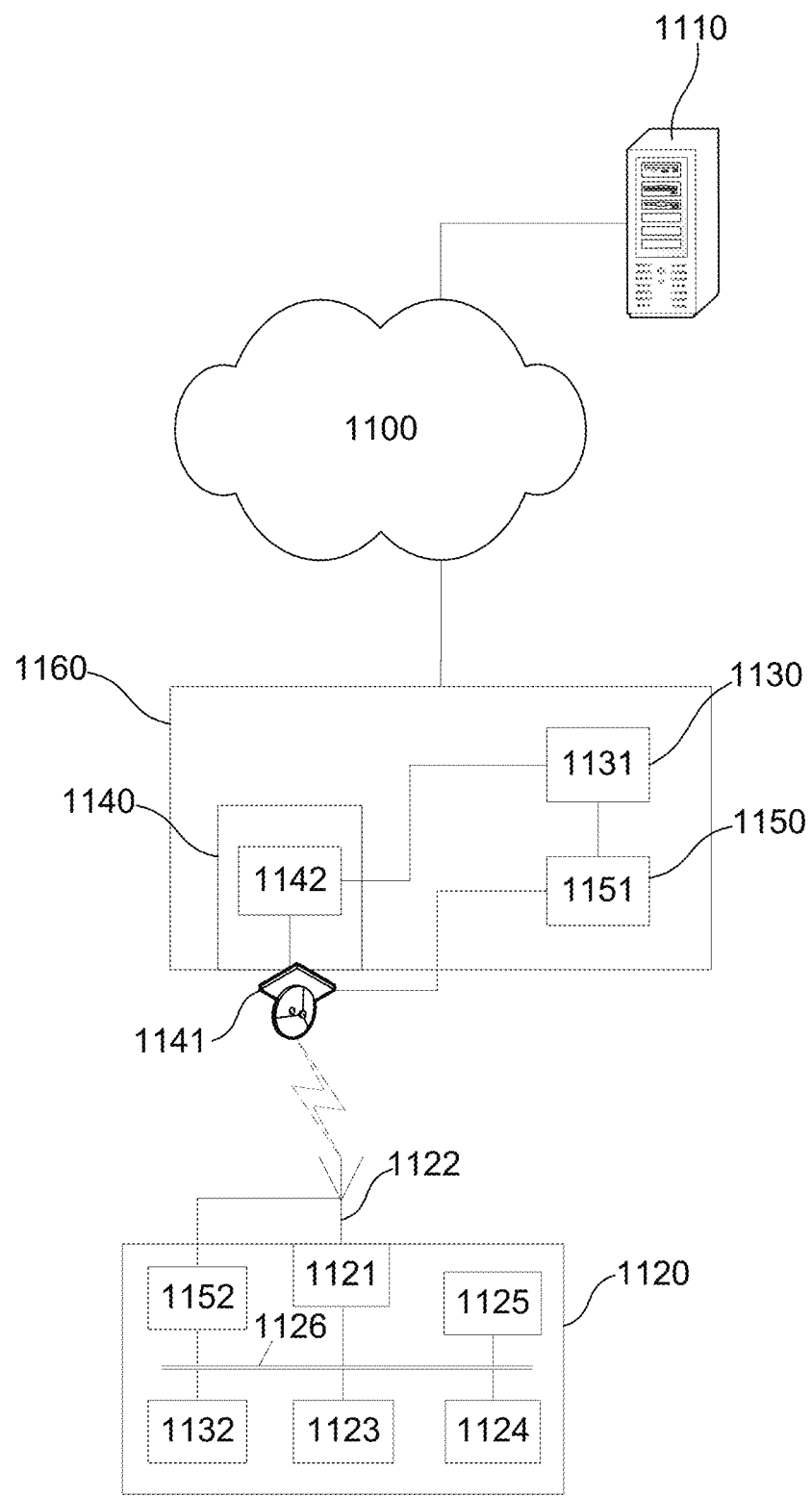
FIG. 11 is a schematic diagram of an example of system for allowing communication between a mobile device and base station.
Figure 12:
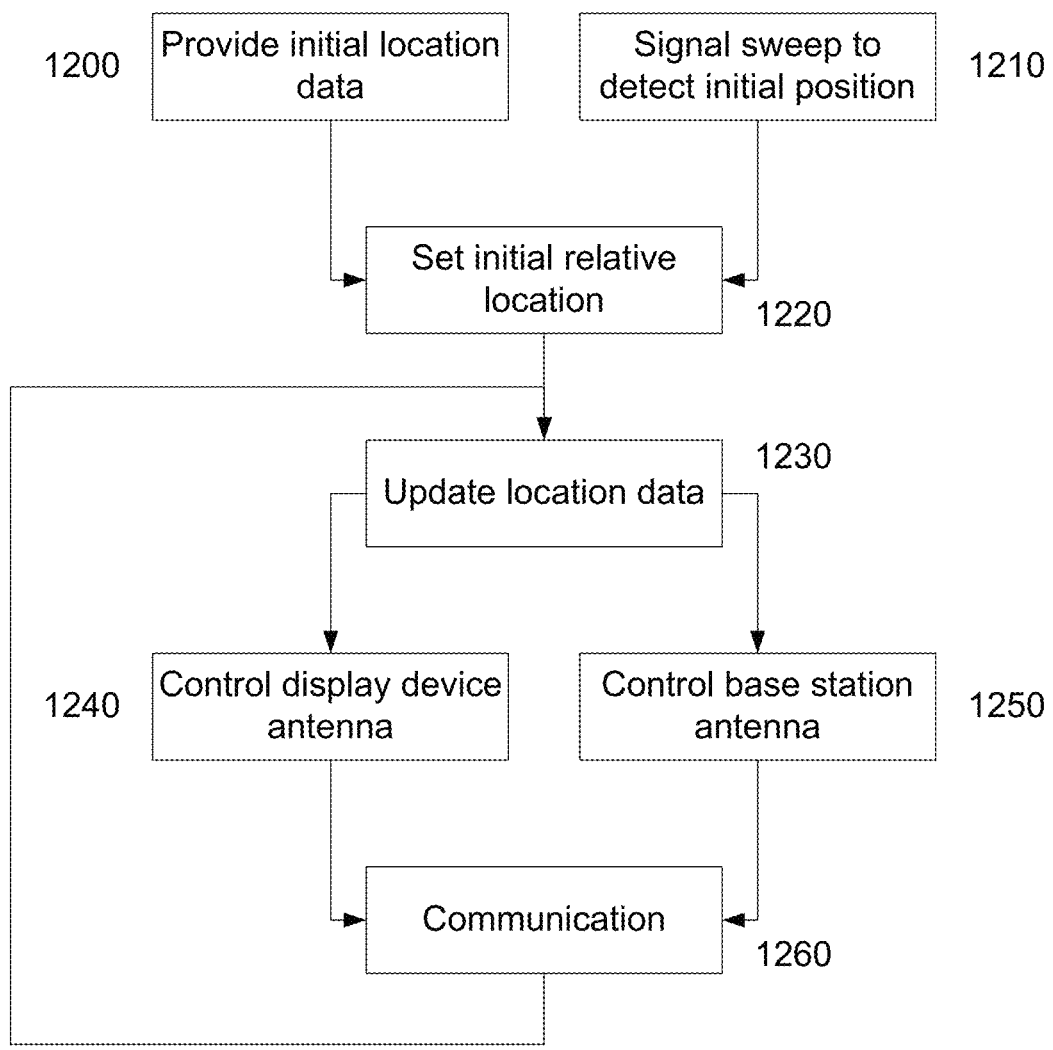
FIG. 12 is a flow chart of an example of the operation of the system of FIG. 11.

An example of a system for allowing communication between a base station and a mobile device will now be described with reference to FIG. 11.

In this example, the system includes a processing system 1110, coupled to a communications network 1100, such as the Internet, private networks, such as 802.11 networks, WANs, or the like. In this example, the processing system 1110 is configured to communicate with the mobile device 1120 via a base station 1160, which in turn communicates with the mobile device using a mobile communications network, such as a 3G, 4G, 5G network, or the like, and provides ongoing connectivity to the communications network 1100.

The processing system 1110 can be of any appropriate form, and in one example is a server configured to generate content for display on the mobile device 1120, such as digital reality content, multimedia content, webpages, or the like. In one example, the processing system 1110 includes a content engine, including a combination of hardware and/or software systems operating to generate AR or VR content, optionally on the basis of signals received from the display systems 120, and any associated hardware, such as associated base stations. Whilst the processing system 1110 is a shown as a single entity, it will be appreciated that the processing system 1110 can be distributed over a number of geographically separate locations, for example by using processing system 1110 provided as part of a cloud based environment. However, the above described arrangement is not essential and other suitable configurations could be used.

In this example, the mobile device 1120 includes a transceiver 1121 and antenna 1122, as well as a processor 1123, memory 1124, input/output device 1125, such as a touchscreen, speaker and microphone, interconnected via a bus 1126. A location module 1132 is also provided, which could be of any appropriate form, such as a GPS module, or other locations system, such as a system employing range sensing to map a local environment. Alternatively, the location module could determine changes in location, such as inertial measurement unit, or accelerometer to measure movement of the mobile device. A control module 1152, for controlling the antenna 1122, and in particular controlling beam forming/beam steering of a phased antenna array, is also provided. Whilst this is shown as a separate module, alternatively this could be incorporated into functionality performed by the processor 1123, depending on the preferred implement.

In use, the processor 1123 executes instructions in the form of applications software stored in the memory 1124 to allow the required processes to be performed. The applications software may include one or more software modules, and may be executed in a suitable execution environment, such as an operating system environment, or the like. The mobile device 1120, is therefore typically a device such as an AR, VR or mixed reality display system, mobile phone, smartphone, tablet, or the like. However, this is not essential and the mobile device could be a portable computing device, such as a laptop, or the like.

In this example, the base station 1160 includes a transmission system 1140 which includes a transmission module 1142 and associated antenna 1141. Although a single module and antenna is shown, it will be appreciated that in practice multiple antennas and modules may be provided. The transmission module 1142 can be adapted to perform suitable encoding of the content stream prior to transmission via the transmission system antennas 1141. The transmission module 1142 can include a combination of hardware and/or software components and in one example includes a dedicated encoder, similar to that described above. The transmission system antenna 1141 is typically a phased array antenna directional whose directionality can be adjusted through electronic beam steering/beam forming. The transmission system antenna 1141 is controlled by a control system 1150 which includes a controller 1151, which is typically a hardware and/or software based controller for controlling the antenna orientation.

The base station 1160 also includes a location system 1130, including a location processing system 1131, which is used to determine the location of the mobile device 1120. The location system 1130 receives location data from the location module 1132 of the mobile device 1120, which defines the mobile device, typically with respect to a local or global environment. The location system then determines the location of the mobile device 1120 relative to the base station 1160, and in particular the base station antenna 1141, allowing the controller 1150 to control the antenna 1141.

It will be appreciated that the base station 1160 will also typically include other infrastructure and component associated with a mobile communications network base station, and that these will not therefore be described.

An example of the process for communicating with the mobile device will now be described. For the purpose of this example, it will be assumed that it has already been established as in the range of the base station 1160 in accordance with standard cellular communications protocols.

In this example, at step 1200, the location module 1132 of the mobile device 1120 determines a position of the mobile device within its environment and provides location data indicative of the location to the base station 1160. At step 1210, the base station 1160 will typically perform a signal sweep, sweeping the direction of transmission to establish a location of the mobile device 1120, based on the strongest signal. This can be performed simultaneously with the mobile device determining the location data, or could be performed after the location data is generated, allowing an approximate location from the location data to be used to constrain the extent of the sweep.

Irrespective of the order, the location system 1130 of the base station 1160 then uses the location data provided by the mobile device 1120 and the results of the signal sweep to set an initial relative location at step 1220, with this also being returned to the mobile device 1120.

At step 1230, as the mobile device 1120 moves, the location module updates the location, with location data being provided to the base station 1160. The location module 1132 of the mobile device 1120 and the location system 1130 of the base station 1160 can update the relative location, allowing the respective controllers 1152, 1151, to control the mobile device antenna 1122 and base station antenna 1141, at steps 1240 and 1250, respectively.

This allows communication to be performed at step 1260, with steps 1230 to 1260 being repeated to allow ongoing communication to performed, without requiring additional signal sweeps.

Accordingly, it will be appreciated that this provides a mechanism for optimising communication between the mobile device 1120 and base station 1160, without requiring ongoing signal sweeps. This reduces latency, whilst maintaining an optimum signal between the mobile device and base station, thereby maximising transmission bandwidth.

Using both the sweep and location data from the mobile device 1120 to perform the initial localisation allows a relative location of the mobile device and base station to be established with a high degree of accuracy. The location of the mobile device can then be updated based on movement relative to the environment, for example using signals from inertial sensors, SLAM algorithms, or the like. This means the location module 1132 does not need to be established an accurate initial location, which is useful in scenarios in which an absolute position cannot be adequately determined, for example if GPS is unavailable. However, it will also be appreciated that in the event that the mobile device is able to provide a sufficiently accurate absolute location relative to the base station environment, then the initial sweep may not be required.

It will also be appreciated that in some situations, it may be necessary to periodically repeat the sweep, for example to account for drift in tracking of the movement and/or location of the mobile device 1120.

Figure 13:
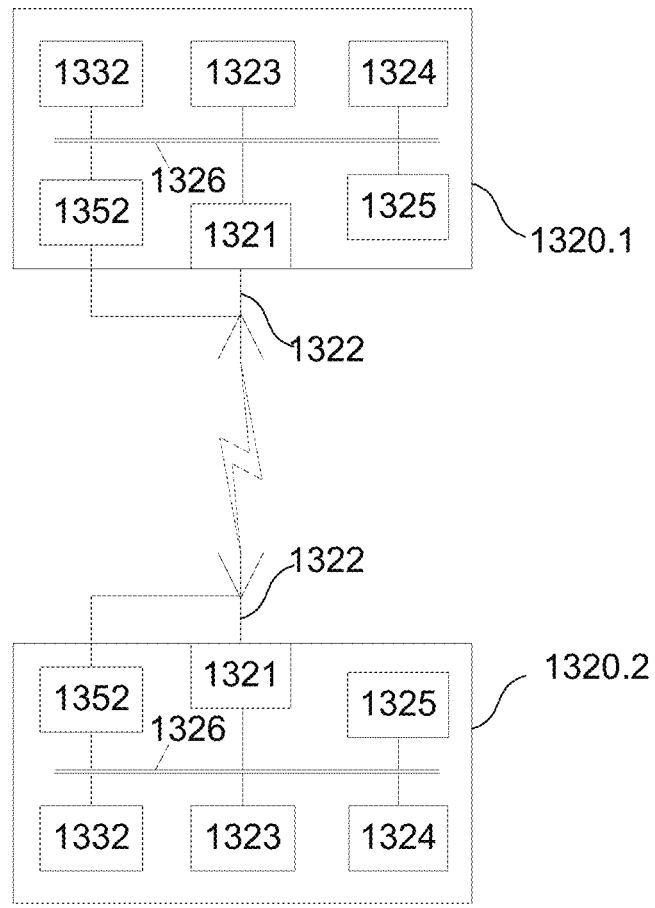
FIG. 13 is a schematic diagram of an example of system for allowing communication between communication devices.

An example of a system for allowing communication between two communication devices will now be described with reference to FIG. 13.

In this example, the system includes two communication devices 1320.1, 1320.2. Each mobile device 1320 includes a transceiver 1321 and antenna 1322, as well as a processor 1323, memory 1324, input/output device 1325, such as a touchscreen, speaker and microphone, interconnected via a bus 1326. A location module 1332 is also provided, which could be of any appropriate form, such as a GPS module, or other locations system, such as a system employing range sensing to map a local environment. Alternatively, the location module could determine changes in location, such as inertial measurement unit, or accelerometer to measure movement of the communication device. A control module 1352, for controlling the antenna 1322, and in particular controlling beam forming/beam steering of a phased antenna array, is also provided. Whilst this is shown as a separate module, alternatively this could be incorporated into functionality performed by the processor 1323, depending on the preferred implement.

In use, the processor 1323 executes instructions in the form of applications software stored in the memory 1324 to allow the required processes to be performed. The applications software may include one or more software modules, and may be executed in a suitable execution environment, such as an operating system environment, or the like. The communication device 1320, is therefore typically a device such as an AR, VR or mixed reality display system, mobile phone, smartphone, tablet, or the like. However, this is not essential and the communications devices could be of any form. Additionally, whilst shown as having a generally similar configuration, this is not essential and the communications devices could be of a different form, such as a computer system and an AR, VR or mixed reality display system.

In this example, the location modules 1332 of the two communication devices exchange locations, allowing the initial relative location to be established. Otherwise, the approach is substantially similar to that described above, and will not therefore be described in further detail.

Accordingly, the above described systems use arrangements in which a location of a device relative to an environment is used in order to track the device location, for the purpose of controlling directional transmissions with the device. This can include controlling an antenna located separately to the device, for transmission to the device, as well as controlling an on-board antenna for the purpose of transmitting to another antenna. In one example, this is used to control a direction of transmission, with this optionally being achieved using beam forming and/or beam steering.

Being able to control antennas and optimise transmission can help maximise available bandwidth. Furthermore, being able to achieve this whilst avoiding the need to perform signal sweeps, which are traditionally used for localisation, can reduce latency significantly and also reduce unnecessary signal transmissions, which can in turn lead to interference between devices. However, it will be appreciated that whilst signal sweeps are preferably avoided, this is not essential and alternatively these could be minimised, for example performing signal sweeps with a reduced frequency, or by reducing the area over which the beam sweep occurs, hence minimising the time taken to perform a sweep, and reducing the amount of signal transmissions performed as part of the sweep.

The above description illustrates two main embodiments, namely providing digital content in a multi-player environment, and communication between two communication devices, more generally. It will be appreciated however, that the multi-player venue scenario is merely a specific example of the more general communication process, and hence that features or processes described in respect of one embodiment could also be implemented in the other embodiment. Description of features or processes in respect of one embodiment only is not therefore intended to be limiting, and features and processes could therefore be used interchangeably as appropriate.

Whilst reference is made throughout to location, it will be appreciated that the term is intended to cover a position and that these terms are effectively analogous and can be used interchangeably.

Furthermore, it will be appreciated that where reference is made to an antenna in the singular, this is not intended to be limiting, and the techniques can be applied to systems including multiple antennas.

Accordingly, the above described system provides a mechanism to allow existing VR or AR hardware to be adapted for use in multiplayer venues. The processes described also have wider application, allowing for localisation of communications devices to be used in order to optimise communication. Specifically the location can be used in order to control a directional antenna, such as a phased array, allowing beam steering and/or beam forming to be performed based on the relative location, or position and orientation, of two communicating devices. This in turn reduces and/or obviates the need to perform beam sweeps, which add significantly to the latency of communications, as well as resulting in more widespread distribution of transmissions, which can in turn increase interference with other devices.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system for displaying content to a plurality of users, the system including:
   a) a plurality of wearable display systems, each display system being worn by a user and including:
      i) a display device to display a content stream;
      ii) a receiver module that wirelessly receives the content stream from an antenna of the transmission system, the receiver module including a decoder for decompressing a compressed content stream;
      iii) a display processing device that causes the content stream to be displayed on the display; and,
      iv) a display system antenna;
   b) for each display system the system includes:
      i) a content engine that generates the content stream;
      ii) an encoder that encodes the content stream to thereby generate a compressed content stream;
      iii) an antenna;
      iv) a transmitter that wirelessly transmits the compressed content stream via the antenna; and,
      v) a controller that:
         (1) determines the location of the display system from a location system; and,
         (2) controls the antenna in accordance with the location of the display system;
   c) a content system that generates a plurality of content streams, each content stream being associated with a corresponding display system;
   d) a location system that detects a location of each display system;
   e) a transmission system including a number of transmission system antennas that wirelessly communicate with the display systems to transmit content to the wearable display systems and to receive data from the wearable display systems; and,
   f) a control system that:
      i) determines the location of each display system from the location system; and,
      ii) selectively controls transmitting antennas in accordance with the location of each display system to thereby at least one of:
         (1) transmit each content stream to the corresponding display system; and
         (2) receive data from a corresponding display system.

2. A system according to claim 1, wherein the transmitting antenna is at least one of a display system antenna and a transmission system antenna.

3. A system according to claim 1, wherein the transmitting antenna is a phased antenna array and the control system controls the phased antenna array to perform at least one of:
 a) beam steering; and,
 b) beam forming.

4. A system according to claim 1, wherein the control system includes a respective controller for each transmission system antenna, with each transmission system antenna transmitting a respective content stream and wherein the controller:
 a) determines the location of the corresponding display system for the respective content stream; and,
 b) controls the transmission system antenna in accordance with the location of the corresponding display system.

5. A system according to claim 1, wherein the transmission system includes a plurality of transmitters and wherein each transmitter transmits a respective content stream via a respective transmission system antenna and wherein the content system includes a plurality of content engines and wherein each content engine generates a content stream for a corresponding display system.

6. A system according to claim 1, wherein the system includes multiple antennas and wherein the control system controls which of the multiple antennas transmits in accordance with the location of each wearable display system.

7. A system according to claim 1, wherein the users are in a multiplayer venue and the location system detects a location of each display system within the venue.

8. A system according to claim 1, wherein the location system includes:
 a) multiple beacons provided in a venue;
 b) a location processing device that determines a location of a display system based on a position of the display system relative to at least two beacons and positions of the at least two beacons in the venue; and,
 c) a location module in each display system that:
  i) detects a signal from at least two beacons;
  ii) calculates a position of the display system relative to the at least two beacons; and,
  iii) transmits location data indicative of the location to the location processing device via a wireless communications system.

9. A system according to claim 1, wherein the location system includes a location module in each display system that determines a display system location, wherein the display system transmits a location indication indicative of the display system location to the control system and wherein the control system:
 a) receives the location indication;
 b) determines the display system location; and,
 c) selectively controls at least one antenna in accordance with the display system location.

10. A system according to claim 9, wherein the location module includes a range sensor that determines a range of the display system from an environment and determines the display system location using a simultaneous localization and mapping algorithm.

11. A system according to claim 1, wherein the control system:
 a) determines movement of a wearable display system; and,
 b) controls a transmitting antenna in accordance with the determined movement.

12. A system according to claim 1, wherein the location system includes a location processing device that:
 a) receives the location data from a location module of a display system;
 b) uses the location data to determine:
  i) an identity of the display system; and,
  ii) the location of the display system; and,
 c) provides a location indication indicative of the location of the display system to the control system in accordance with the identity of the display system.

13. A system according to claim 1, wherein the system includes a plurality of encoders, each encoder compressing a respective content stream to thereby generate a compressed content stream that is transmitted to the display system and wherein each display system includes a decoder for decompressing the compressed content stream.

14. A system according to claim 1, wherein the control system:
 a) retrieves an environment map; and,
 b) selectively controls the transmitting antenna at least partially in accordance with the location and the environment map.

15. A system according to claim 1, wherein the control system:
 a) retrieves an occlusion map defining:
  i) occlusion locations within a venue; and,
  ii) a transmission path to avoid the occlusion; and,
 b) selectively controls the antennas in accordance with the location of each display system and the occlusion map.

16. A system according to claim 15, wherein the control system:
 a) detects occlusion of a display system;
 b) controls one or more antennas to adjust a transmission direction to thereby re-establish communication with the display system;
 c) determines a display system location; and,
 d) updates an occlusion map with the display system location and the transmission direction.

17. A system according to claim 1, wherein at least one of:
 a) the control system:
  i) determines a location of at least one other wearable display system; and,
  ii) controls the antenna in accordance with the location of the at least one other wearable display system; and,
 b) the control system:
  i) determines a communications channel used by the at least one other wearable display system; and,
  ii) selectively controls a communications channel used by the antenna in accordance with the communications channel of the at least one other wearable display system.

18. A system for displaying content to a plurality of users, the system including:
 a) a plurality of wearable display systems, each display system being worn by a user and including:
  i) a display device to display a content stream;
  ii) a receiver module that wirelessly receives the content stream from an antenna of the transmission system, the receiver module including a decoder for decompressing a compressed content stream; and,
  iii) a display processing device that causes the content stream to be displayed on the display;
 b) for each display system the system includes:
  i) a content engine that generates the content stream;
  ii) an encoder that encodes the content stream to thereby generate a compressed content stream;
  iii) an antenna;
  iv) a transmitter that wirelessly transmits the compressed content stream via the antenna; and, v) a controller that:
(1) determines the location of the display system from a location system; and,
(2) controls the antenna in accordance with the location of the display system;
c) a content system that generates a plurality of content streams, each content stream being associated with a corresponding display system;
d) a location system that detects a location of each display system;
e) a transmission system including a number of antennas that wirelessly transmit content to the wearable display systems; and,
f) a control system that:
i) determines the location of each display system from the location system; and,
ii) selectively controls the antennas in accordance with the location of each display system to thereby transmit each content stream to the corresponding display system.

19. A display system for use in a system for displaying content to a plurality of users, the display system including:
a) a display device, including:
i) a receiver module that wirelessly receives the content stream from an antenna of the transmission system, the receiver module including a decoder for decompressing a compressed content stream; and,
ii) a display processing device that causes the content stream to be displayed on the display;
b) a content engine that generates the content stream;
c) an encoder that encodes the content stream to thereby generate a compressed content stream;
d) an antenna;
e) a transmitter that wirelessly transmits the compressed content stream via the antenna;
f) a controller that:
i) determines the location of the display system from a location system; and,
ii) controls the antenna in accordance with the location of the display system;
g) a processing device that causes the content stream to be displayed on the display device;
h) a receiver module that wirelessly receives the content stream from a transmission system, the transmission system including a number of antennas that transmit content to a plurality of wearable display systems; and,
i) a location module that:
i) calculates a location of the display system; and,
ii) transmits location data indicative of the location to a location processing device via a wireless communications system thereby allowing the location processing device to determine a location of the display system.

* * * * *